(12) United States Patent
Kober et al.

(10) Patent No.: US 7,626,542 B2
(45) Date of Patent: Dec. 1, 2009

(54) MITIGATING INTERFERENCE IN A SIGNAL

(75) Inventors: Wolfgang Kober, Aurora, CO (US); Robert Kent Krumvieda, Westminster, CO (US); Lewis Reynolds, Denver, CO (US); Steven Alan Kadlec, Lafayette, CO (US)

(73) Assignee: Data Fusion Corporation, Northglenn, CO (US)

( * ) Notice: Subject to any disclaimer, the term of this patent is extended or adjusted under 35 U.S.C. 154(b) by 38 days.

(21) Appl. No.: 11/362,600

(22) Filed: Feb. 23, 2006

(65) Prior Publication Data

US 2009/0141775 A1 Jun. 4, 2009

Related U.S. Application Data

(60) Provisional application No. 60/656,668, filed on Feb. 25, 2005.

(51) Int. Cl.
 *G01S 1/00* (2006.01)
(52) U.S. Cl. .................................. 342/357.12
(58) Field of Classification Search ....... 342/357.01–17
 See application file for complete search history.

(56) References Cited

U.S. PATENT DOCUMENTS

| | | | |
|---|---|---|---|
| 642,243 A | 1/1900 | Moran et al. | |
| 4,088,955 A | 5/1978 | Baghdady | 325/56 |
| 4,309,769 A | 1/1982 | Taylor, Jr. | 375/1 |
| 4,359,738 A | 11/1982 | Lewis | 343/100 |
| 4,665,401 A | 5/1987 | Garrard et al. | 342/75 |
| 4,670,885 A | 6/1987 | Parl et al. | 375/1 |
| 4,780,885 A | 10/1988 | Paul et al. | 375/40 |
| 4,852,166 A | 7/1989 | Masson | 380/36 |
| 4,856,025 A | 8/1989 | Takai | 375/40 |
| 4,893,316 A | 1/1990 | Janc et al. | 375/44 |
| 4,922,506 A | 5/1990 | McCallister et al. | 375/1 |

(Continued)

FOREIGN PATENT DOCUMENTS

DE 42 01 439 A1 7/1993

(Continued)

OTHER PUBLICATIONS

Alfonso N. Barbosa, Adaptive Detection od DS/CDMA signals in Fading channels, IEEE, vol. 46, No. 1, Jan. 1998.*

(Continued)

*Primary Examiner*—Thomas H Tarcza
*Assistant Examiner*—Harry Liu
(74) *Attorney, Agent, or Firm*—Sheridan Ross P.C.

(57) ABSTRACT

A method and receiver are disclosed for mitigating or substantially canceling signal interference between signals detected at the receiver. Once a presumed interfering signal(s) is acquired, parameters are determined that allow the interferer(s) to be modeled. The phase invariance of the process eliminates the need to acquire the interferer's phase. An orthogonal projection (for projecting onto a detection subspace which is orthogonal to a subspace spanned by the interferer(s)) is applied to the composite of all signals (y) for thereby projecting y onto the detection subspace. The interference subspace is non-orthogonal to a representation of desired (but interfered) signal of the composite signals. With the receiver properly equipped to perform this projection operation, interfering signals, multipath, multipath-like, and structured jamming signals can be effectively diminished.

30 Claims, 10 Drawing Sheets

U.S. PATENT DOCUMENTS

| | | | |
|---|---|---|---|
| 4,933,639 A | 6/1990 | Barker | 324/309 |
| 4,965,732 A | 10/1990 | Roy, III et al. | 364/460 |
| 5,017,929 A | 5/1991 | Tsuda | 342/427 |
| 5,099,493 A | 3/1992 | Zeger et al. | 375/1 |
| 5,105,435 A | 4/1992 | Stilwell | 375/1 |
| 5,109,390 A | 4/1992 | Gilhousen et al. | 375/1 |
| 5,119,401 A | 6/1992 | Tsujimoto | 375/14 |
| 5,136,296 A | 8/1992 | Roettger et al. | 342/26 |
| 5,151,919 A | 9/1992 | Dent | 375/1 |
| 5,218,359 A | 6/1993 | Minamisono | 342/383 |
| 5,218,619 A | 6/1993 | Dent | 375/1 |
| 5,220,687 A | 6/1993 | Ichikawa et al. | 455/254 |
| 5,224,122 A | 6/1993 | Bruckert | 375/1 |
| 5,237,586 A | 8/1993 | Bottomley | 375/1 |
| 5,244,122 A | 9/1993 | Botts | 222/133 |
| 5,263,191 A | 11/1993 | Dickerson | 455/304 |
| 5,272,695 A | 12/1993 | Makino et al. | 370/32.1 |
| 5,280,472 A | 1/1994 | Gilhousen et al. | 370/18 |
| 5,305,349 A | 4/1994 | Dent | 375/1 |
| 5,309,232 A | 5/1994 | Hartung et al. | 348/384 |
| 5,323,322 A | 6/1994 | Mueller et al. | 364/449 |
| 5,325,394 A | 6/1994 | Bruckert | 375/1 |
| 5,343,496 A | 8/1994 | Honig et al. | 375/1 |
| 5,347,535 A | 9/1994 | Karasawa et al. | 375/1 |
| 5,353,302 A | 10/1994 | Bi | 375/1 |
| 5,355,533 A | 10/1994 | Dickerson | 455/306 |
| 5,386,202 A | 1/1995 | Cochran et al. | 332/100 |
| 5,390,207 A | 2/1995 | Fenton et al. | 375/1 |
| 5,394,110 A | 2/1995 | Mizoguchi | 329/304 |
| 5,394,434 A | 2/1995 | Kawabe et al. | 375/205 |
| 5,396,256 A | 3/1995 | Chiba et al. | 342/372 |
| 5,412,391 A | 5/1995 | Lewis | 342/379 |
| 5,437,055 A | 7/1995 | Wheatley, III | 455/33.3 |
| 5,440,265 A | 8/1995 | Cochran et al. | 329/300 |
| 5,448,600 A | 9/1995 | Lucas | 375/205 |
| 5,481,570 A | 1/1996 | Winters | 375/347 |
| 5,513,176 A | 4/1996 | Dean et al. | 370/18 |
| 5,533,011 A | 7/1996 | Dean et al. | 370/18 |
| 5,553,098 A | 9/1996 | Cochran et al. | 375/324 |
| 5,557,284 A | 9/1996 | Hartman | 342/357 |
| 5,566,167 A | 10/1996 | Duttweiler | 370/32.1 |
| 5,602,833 A | 2/1997 | Zehavi | 370/209 |
| 6,128,589 A | 10/2000 | Lilly | |
| 6,166,690 A | 12/2000 | Lin et al. | 342/383 |
| 6,177,893 B1 | 1/2001 | Velazquez et al. | 341/118 |
| 6,252,535 B1 | 6/2001 | Kober et al. | 341/155 |
| 6,268,824 B1 | 7/2001 | Zhodzishky et al. | 342/357.04 |
| 6,282,231 B1 | 8/2001 | Norman et al. | 375/144 |
| 6,313,786 B1 | 11/2001 | Sheynblat et al. | 342/357.02 |
| 6,349,272 B1 | 2/2002 | Phillips | |
| 6,362,760 B2 | 3/2002 | Kober et al. | 341/141 |
| 6,380,879 B2 | 4/2002 | Kober et al. | 341/155 |
| 6,430,216 B1 | 8/2002 | Kober et al. | 375/148 |
| 6,466,566 B1* | 10/2002 | De Gaudenzi et al. | 370/342 |
| 6,549,151 B1 | 4/2003 | Kober et al. | 341/141 |
| 6,701,137 B1* | 3/2004 | Judd et al. | 455/121 |
| 6,711,219 B2 | 3/2004 | Thomas et al. | 375/346 |
| 6,750,818 B2 | 6/2004 | Thomas et al. | 342/450 |
| 6,771,214 B2* | 8/2004 | Kober et al. | 342/357.12 |
| 6,856,945 B2 | 2/2005 | Thomas et al. | 702/189 |
| 6,884,490 B2 | 4/2005 | Kober et al. | 375/148 |
| 6,947,474 B2 | 9/2005 | Kober et al. | |
| 2001/0000216 A1 | 4/2001 | Kober et al. | 341/155 |
| 2001/0000660 A1 | 5/2001 | Kober et al. | 341/6 |
| 2001/0033607 A1 | 10/2001 | Fleming et al. | 375/150 |
| 2001/0046256 A1 | 11/2001 | Norman et al. | 375/148 |
| 2002/0021241 A1 | 2/2002 | Zhodzishky et al. | 342/357.02 |
| 2002/0047801 A1 | 4/2002 | Agnani et al. | 342/424 |
| 2002/0050944 A1 | 5/2002 | Sheynblat et al. | 342/357 |
| 2002/0090025 A1 | 7/2002 | Kober et al. | 375/148 |
| 2003/0218568 A1* | 11/2003 | Kober et al. | 342/357.12 |
| 2004/0017311 A1 | 1/2004 | Thomas et al. | 342/450 |
| 2004/0022302 A1 | 2/2004 | Olson et al. | 375/148 |
| 2004/0030534 A1 | 2/2004 | Thomas et al. | 702/189 |
| 2004/0052305 A1* | 3/2004 | Olson et al. | 375/148 |
| 2004/0146093 A1 | 7/2004 | Olson et al. | 375/148 |
| 2004/0151235 A1 | 8/2004 | Olson et al. | 375/148 |
| 2004/0160924 A1 | 8/2004 | Olson et al. | 370/335 |
| 2006/0153283 A1* | 7/2006 | Scharf et al. | 375/148 |

FOREIGN PATENT DOCUMENTS

| | | |
|---|---|---|
| DE | 43 26 843 A1 | 2/1995 |
| DE | 43 43 959 A1 | 6/1995 |
| EP | 0 283 302 A2 | 9/1988 |
| EP | 0 558 910 A1 | 9/1993 |
| EP | 0 610 989 A2 | 8/1994 |
| EP | 0 648 026 A1 | 4/1995 |
| EP | 1 115 248 A1 | 7/2001 |
| GB | 2 280 575 A | 2/1995 |
| JP | 7-74687 | 3/1995 |
| WO | WO 93/12590 | 6/1993 |
| WO | WO 98/08319 | 2/1998 |
| WO | WO 99/09650 | 2/1999 |
| WO | WO 2004/036783 | 4/2004 |
| WO | WO 2004/036811 A2 | 4/2004 |
| WO | WO 2005/114248 | 12/2005 |

OTHER PUBLICATIONS

Glennon, et al., "A Review of GPS Cross Correlation Mitigation Techniques." *The 2004 International Symposium of GNSS/GPS.* 2004.

Keshava, et al., "The Relationship Between Detection Algorithms for Hyperspectral and Radar Applications." *Presentation Slides from ASAP Conference*, Mar. 14, 2001. Www.II.mit.edu/asap/asap/_01/precvgs/keshavaw.pm.pdf.

Krumvieda, K. Et al., "A Complete IF Software GPS Receiver: A Tutorial about the Details" pp. 1-22.

Nickel, U.R.O., "Fast Subspace Methods for Radar Applications." *Advanced Signal Processing: Algorithms, Architectures, and implementations.* VII, vol. 3162, pp. 438-448. 1997.

Sharma, et al., "Matched Subspace Detectors for Discrimination of Targets From Trees in SAR Imagery." *Thirty-Fourth Asilomar Conference on Signals, Systems and Computers*, vol. 2, pp. 1721-1726. 2000.

Payton, et al., "Invariant Methods for Indexing and Relative Reconstruction of 3D Models Using 1D HRR and 2D SAR." The International Society of Optical Engineering. vol. 3454. pp. 121-133. 1998.

Written Opinion dated Sep. 25, 2007 for PCT Application No. PCT/US06/06094 (6 pages).

International Search Report dated Sep. 25, 2007 for PCT Application No. PCT/US06/06094 (3 pages).

* cited by examiner

MITIGATING INTERFERENCE IN A SIGNAL

CROSS-REFERENCE TO RELATED APPLICATIONS

This application claims the benefits of U.S. Provisional Application Ser. No. 60/656,668 entitled "Mitigating Interference in a Signal," filed Feb. 25, 2005, and hereby incorporated by reference.

FIELD OF THE INVENTION

The invention relates generally to the field of structured signal receivers and more particularly to a method for mitigating structured interference in a received composite signal by modeling the interference and then subsequently removing the interference from the signal.

BACKGROUND OF THE INVENTION

An example of a structured signal receiver is a Global Positioning System (GPS) receiver which is part of the United States' Global Positioning System (GPS), also known as a radio-navigation satellite system (RNSS). The GPS was established by the United States government, and employs a constellation of 24 or more satellites in well-defined orbits at an altitude of approximately 26,500 km. These satellites continually transmit microwave L-band radio signals in two frequency bands centered at 1575.42 MHz and 1227.6 MHz, denoted L1 and L2, respectively. These signals include timing patterns relative to the satellites' onboard precision clocks (which are kept synchronized by ground stations) as well as navigation messages giving the precise orbital positions of the satellites, an ionosphere model, and other useful information. A GPS receiver processes these radio signals to compute ranges to the GPS satellites; and, by triangulating these ranges, the GPS receiver determines its position and its internal clock error.

GPS's designers assumed that all transmitters would be aboard satellites located at large and relatively constant distances from all user receivers, consequently generating weak but relatively constant signal levels at the receivers. This assumption drove a number of trade-offs in system and satellite transmitter design and continues to influence receiver development even today.

Despite this assumption, ground-based transmitters (known as PLs, pseudo-satellites, or simply pseudolites) have been used to complement the GPS satellites from the very beginning. In the foreseeable future, PLs may be incorporated in unmanned aerial vehicles (UAVs). A PL transmits a signal with code-phase, carrier-phase, and data components which may or may not have the same timing and format as the satellite signals. A GPS receiver acquires such a PL signal and derives code-phase pseudo-ranges or carrier-phase measurements to be used in a navigation algorithm in substantially the same manner as for a GPS satellite signal. The major differences between a satellite and PL are that a PL typically does not contain a high-accuracy atomic clock and that the PL position must be described using geographical terms rather than orbital elements.

Precision navigation and landing systems require reliable and highly accurate position, velocity and time (PVT) information that cannot be obtained by standalone GPS. Precision-guided weapons require reliable PVT information to achieve acceptable Circularly Error Probable (CEP) targeting errors. To meet these requirements, additional radio-navigation transmitters are needed. These transmitters can be additional satellites as specified in the Wide Area Augmentation System (WAAS); ground-based PLs as specified in the Local Area Augmentation System (LAAS); ship-based PLs; or, PLs on UAVs loitering in the air above an area of interest. WAAS and LAAS can transmit either correction data (i.e., differential data) or provide additional ranging information. When these transmitters broadcast augmentation signals in the GPS spectrum, additional interference is introduced into the GPS spectrum. This structured interference is like noise to the receiver, degrading the performance and in some cases preventing a receiver from acquiring and tracking the satellites.

Moreover, the use of PLs violates one of the key assumptions behind the design of GPS. The distance between a user receiver and a PL can range from short to long, so PL signal levels at a receiver can vary significantly. Relatively strong PL signals may overwhelm satellite signals and jam a receiver. Weak PL signals may be too feeble to allow receiver tracking. The challenge associated with this variable range effect is known as the "near-far problem" in wireless communications.

Equally problematic is structured interference arising from sharing the GPS radio frequency spectrum with other users or from the encroachment of other users' signals on the GPS spectrum. For example, Mobile Satellite Systems (MSS) downlinks, wind profiler radar, space-based radar, ultra-wideband systems, GPS expansion and the European Radio Navigation Satellite System known as Galileo, employ or may use frequencies in and around the GPS spectrum. In another example, GPS jamming technologies may broadcast interference signals in the GPS spectrum. These various RF systems introduce interference into existing RNSS systems either unintentionally or intentionally.

Another type of interference is self interference, which results when signals from a radio-navigation transmitter interfere with the reception of radio-navigation signals at the receiver. This type of interference often occurs when a RNSS receiver and transmitter are located physically near (or identical to) each other. Self interference is an extreme case of "near-far problem."

In conclusion, many types of structured interference exist within the RNSS RF spectrum. It is desirable to have a method and apparatus to identify and remove such wireless interference that degrades or compromises legitimate radio navigation signals. In particular, it is advantageous to reduce or mitigate the near-far problem in radio navigation.

Abbreviations

The following abbreviations are used herein.
ADC: Analog to Digital Converter
AFRL: Air Force Research Lab
C/A code—Coarse/Acquisition or Clear/Acquisition Code
CDMA—Code Division Multiple Access
CEP—Circular Error Probable
DARPA—Defense Advanced Research Projects Agency
DGPS—Differential GPS
DLL—Delay Locked Loop
DOP—Dilution of Precision
E code—European code
DSP—Digital Signal Processing
FLL—Frequency Locked Loop
FPGA—Field Programmable Gate Array
GNSS—Global Navigation Satellite System (ICAO definition)
GPS—Global Positioning System
I—In phase.
IF—Intermediate Frequency IMU—Inertial Measurement Unit
INS—Inertial Navigation System
LAAS—Local Area Augmentation System
MAS—Multiple Access System
MFD—Matched Filter Detector
MSD—Matched Subspace Detector
MSS—Mobile Satellite System
NF—Near Far
NFR—Near Far Resistant
P(Y) code—Precision (Encrypted) code
PL—Pseudolite, pseudo-satellite
PLL—Phase Locked Loop
PRN—Pseudo Random Noise code, e.g., C/A Gold codes and the P(Y) codes.
PVT—Position, Velocity, and Time
Q—Quadrature
RAIM—Receiver Autonomous Integrity Monitoring
RF—Radio Frequency
RNSS—Radio Navigation Satellite System
ROC—Receiver Operating Characteristic
SA—Selective Availability
SNR—Signal to Noise Ratio
SV—Space Vehicle (e.g., an RNSS satellite)
VCO—Voltage Controlled Oscillator
UAV—Unmanned Aerial Vehicle
UMP—Uniformly Most Powerful
USAF—United States Air Force
WAAS—Wide Area Augmentation System

TERMS AND DEFINITIONS

It is advantageous to define several terms before describing the invention. It should be appreciated that the following definitions are used throughout this application. When the definition of a term departs from the commonly used meaning of the term, the applicant intends to utilize the definition provided below unless otherwise indicated.

GPS Codes: Each GPS satellite or PL transmits two or more different codes. Such codes typically include a coarse/acquisition (C/A) code and a precision (encrypted) (P(Y)) code. Each C/A-code is a unique sequence of 1023 bits, called chips, which is repeated each millisecond. The duration of each C/A-code chip is about 1 micro-second. The corresponding C/A-code chip width is about 300 m, and the C/A-code chipping rate is 1.023 MHz (or megachips/s (Mcps)). A P-code is a unique segment of an extremely long ($\approx 10^{14}$ chips) PRN sequence. The P(Y)-code chipping rate is 10.23 Mcps, and the P(Y)-code chip width is about 30 m. The shorter P(Y)-code chip width provides greater precision in range measurements than for the C/A-codes. Other codes exist or are planned for the future, both in U.S. and foreign systems; this invention applies to them as well.

Wireless Signal Model:

Let a wireless navigation signal y be modeled as follows:

$$y = H\theta + S\phi + n \quad (1)$$

where

H is the desired or target signal (a vector) or signals (a matrix);

$\theta$ is a scalar or vector corresponding to the amplitude(s) of the target signal(s) in H;

S is the known structured interference signal (a vector) or signals (a matrix);

$\phi$ is a scalar or vector corresponding to the amplitude(s) of the interference signal(s) in S;

n is noise; and,

H and S are formed by concatenating known signal vectors, for example:

$$S = [s_1 s_2 \ldots s_N] \quad (2)$$

where $s_i$ is the $i^{th}$ interference signal.

In Phase (I) and Quadrature (Q) Components of a Signal refer to the signal components generated by Quadrature Amplitude Modulation techniques, which is a modulation method using both a carrier wave (e.g., the In Phase or I signal component) and a 'quadrature' carrier wave that is 90° out of phase with the main carrier (e.g., the Quadrature or Q signal component).

Near-Far Interference: Commingling of two or more different wireless signals from one or more wireless sources in such a manner that when the commingled signal is received, the stronger signal component(s) (e.g., likely from a source nearer to the receiver) overwhelm(s) the weaker signal components(s) (e.g., likely from a source farther away from the receiver). In particular, the stronger signal component may "leak" into the signal detector (e.g., cross correlation) for the weaker component and thus compromise the accurate detection of the weaker signal component.

Near-Far (NF) interference can occur both in military and civilian environments and can be from friendly or hostile sources. Friendly sources include PseudoLites (PLs) placed at airports to enhance navigation. A strong PL signal can actually interfere with the receiver's ability to acquire and track the satellites' signals, thereby unintentionally denying the receiver to be used in navigation.

Hostile interference may be found in the military arena. A hostile force may deploy ground- or air-based PLs with the intent of confusing GPS receivers within an area. Any type of military hardware that uses a GPS receiver is susceptible to this jamming.

Structured interference is any wireless (e.g., radio) interference source whose signals can be predictively modeled.

Self-Interference: Wireless signal interference that occurs when a receiver is collocated (i.e., located within a proximity sufficient to induce interference) with a transmitter. Self interference can result when signals transmitted from a radio-navigation transmitter interfere with a radio-navigation signal received on the same antenna used for transmitting. This type of interference often occurs when a receiver doubles as a transmitter. Self interference is an extreme case of "near-far" interference.

Multipath & Jamming Interference: Smart jamming can be used to cause an active radio-navigation receiver to lock onto legitimate-appearing but false signal(s); the receiver is then slowly drawn off the desired path causing significant PVT errors. Multipath-like interference is the reception, delay, and rebroadcast of radio navigation signals to confuse a navigation system or user. Multipath signals are signals that have an increased geometric path delay due to reflections of the line-of-site signal.

Higher Order DLL, FLL, PLL: Generally, the order of a phase locked loop (PLL) is 1 higher than the order of the loop filter. If the loop filter is omitted, i.e., if the output of the phase detector directly controls a voltage controlled oscillator (VCO), a first-order PLL is obtained. The term "order" is defined as the exponent of the largest term in the filter polynomial. Since higher-order loop filters offer better noise cancellation, loop filters of order 2 or more are used in critical applications.

Massively parallel acquisition scheme is a system that can (at least substantially) continuously acquire signals of interest. Its ability to divide the Doppler, phase and code offset search space is only limited by the number of correlators and speed of the processors. In theory such a system could provide the interference modeling parameters to the present invention.

Navigation Data: GPS transmits a navigation data message which includes a telemetry word, a hand-over word, clock corrections, SV health/accuracy, ephemeris parameters, almanac, ionospheric model and coordinated universal time data.

Nominal Satellites are satellites operating normally or within their design specifications.

Processing Channel: A processing channel of a GPS receiver provides the circuitry necessary to process the signal from a GPS transmitter (e.g., a satellite, or pseudolite). The acquisition and tracking functions take place in a processing channel.

Steady State: A computational state of an embodiment of a GPS receiver according to the present invention, wherein: (at least) most or (typically) all of the interfering signals (collectively in S) have been identified (i.e., "labeled"); and, (at least) most or (typically) all of the signals (interferers and non-interferers) have achieved "good lock" by the GPS receiver. "Good lock" denotes that the estimates of Doppler, phase and offsets are varying within an acceptable range (e.g., one set of experiments indicated phase must be within 12 degrees of truth, Doppler must be within 28 Hz of truth, and code offset must be within $\frac{1}{50}$ of a chip).

Phase Invariant Process: A phase invariant process requires no knowledge or estimation of the phase of the interfering signal(s), i.e., any phase value produces the same result.

SUMMARY OF THE INVENTION

The present invention is a signal processing method and system for reducing interference so that a receiver can more effectively detect and utilize legitimate wireless signals as well as mitigate, cancel and/or remove interfering wireless signals. The present invention is applicable to a broad range of architectures for processing structured wireless signals in which the interference to be removed can be predictively modeled (e.g., interference whose structure is known and can be simulated). The present invention can therefore be applied to a broad number of structured signal types including radio navigation (including for example GPS, GLONASS and Galileo), RADAR, and cellular signals and in a variety of interference applications, including interfering signals having powers equal and/or unequal to a signal of interest, whether the interference is narrowband, swept, or chirped, and in the removal or isolation of specific signals in a composite signal.

The present invention is normally not limited to any frequency or modulation scheme. For example, the present invention can be employed with a broad range of frequencies, modulation schemes and PRNs including L1, L2, L5, Galileo's E1 and E2, GLObal NAvigation Satellite System or GLONASS, Code Division Multiple Access or CDMA, Frequency Division Multiple Access or FDMA, Time Division Multiple Access or TDMA, Coarse/Acquisition or C/A code, Precision code or P code, Precision (Encrypted) or P(Y) code, Military code or M code, and Galileo Binary Offset Carrier or BOC codes, and to GPS augmentation methods including Differential GPS or DGPS schemes (which are code- and carrier-based and include both Local-Area and Wide-Area DGPS), Wide Area Augmentation System or WAAS, Local Area Augmentation System or LAAS, European Geostationary Navigation Overlay Service or EGNOS, and Space Based Augmentation System or SBAS.

In one embodiment, the present invention includes the following steps:

(a) receiving a composite signal (y), y including, from each of a number of signaling sources, a corresponding wireless signal comprising information;

(b) obtaining, for each of the wireless signals, respective signal modeling data indicative of the corresponding wireless signal, the respective signal modeling data representing both in phase and quadrature components of the corresponding signal;

(c) projecting a representation of y, onto a subspace, the subspace being orthogonal to a space spanning a representation of at least one signal ($s_0$) of the corresponding wireless signals, the space being determined using the respective signal modeling data for the signal(s) $s_0$ and the subspace being non-orthogonal to a representation of another signal ($h_O$) of the wireless signals;

(d) using a result from step (c) to acquire the signal $h_O$; and (e) after acquiring the signal $h_O$, determining the information from the signal $h_O$.

The signal processing embodiment is normally performed after the antenna, signal sampling, and analog-to-digital stages in the signal receiver. The invention can therefore work with various antenna architectures and antenna-based interference mitigation techniques, including multiple antennas, multiple-element antennas, adaptive antenna arrays, and multi-beam and adaptive nulling antennas. The embodiment can work with various signal sampling schemes, including direct Radio Frequency or RF sampling, Intermediate Frequency or IF sampling, baseband sampling (e.g., quadrature sampling), and bandpass sampling.

In DGPS schemes, common (i.e., correlated) errors are preferably removed after the signal processing techniques of the present invention are performed.

In one configuration, the receiver, when in steady state operation, performs the method of this embodiment by treating all known signals except for the current channel's signal as interference and building the S (interferer) matrix appropriately.

In another configuration, which is suboptimal, the receiver, during steady state operation, builds the interferer matrix with only the n highest-powered signals. N is the number of interferers and is limited by computational constraints. This configuration can determine the matrix S with a minimal of computational intensity and therefore allow for good performance with lower computational requirements.

The present invention can have a number of advantages depending on the particular configuration:

First, signal processing in this method generally does not depend on the particular radio-navigation signal that is transmitted. For example, the present invention can be applied to any signal frequency (e.g. radio frequencies CA2, L1, L2, L5, E1, E2, M1, M2). In addition, it can be applied to any pseudorandom number (PRN) code (e.g., Coarse Acquisition (C/A) code, Precise P(Y) code, Military M-codes, and the to-be-defined E-codes).

Second, radio-navigation receivers equipped with an embodiment of the invention can be resistant to near-far interference (including special cases such as self-interference, multipath interference, and jamming).

Third, this invention can eliminate the necessity to determine the phase of the carrier of the interfering signals. Thus, interference mitigation in this invention is a phase-invariant process.

Fourth, this invention can be used with and transparent to existing navigation augmentation and landing systems (e.g. WAAS, LAAS, and Inertial Navigation Systems (INS)). Furthermore, should these augmentation and landing systems provide ranging information, the present invention can be an integral part of their receiver architectures.

Fifth, this invention is fully compatible with most current Receiver Autonomous Integrity Monitoring (RAIM) techniques. RAIN provides timely warnings to GPS receiver users when the integrity of their PVT solution has been compromised. The various RAIM techniques are all based on some kind of self-consistency check among the available measurements. To be effective RAIM requires redundancy of information, i.e., 5 satellites to detect an anomaly and 6 satellites to identify and remove its faulty data from the navigation solution. Accordingly, the present invention adds an additional integrity monitoring technique for detecting and preventing smart jamming, and multipath signals.

Sixth, this invention can make radio-navigation receivers more robust to interference. Embodiments of the invention can operate within a radio-navigation receiver as a signal processing technique. Additionally, embodiments of the present invention can be effectively used on analog or digital signals, and on RF or IF ranges. Thus, if predetermined and/or predictable structured interference is present in a wireless navigation signal, such interference can be removed and the resultant signal is passed to acquisition and tracking routines, as one skilled in the art will understand.

Seventh, the invention can be embodied in software, firmware or other programmable techniques within a GPS receiver having appropriate hardware to enable the signal processing performed by the present invention. Moreover, substantially all processing performed by the invention is embedded within the logic of one or more special purpose hardware components (e.g., chips, logic circuits, etc.), eliminating the need for programming such hardware components. Of course, hybrid embodiments that are between a substantially programmed embodiment and a substantially hardware embodiment are also within the scope of the present invention.

Other objects, features, and advantages of the present invention will be apparent from the following detailed description of the preferred embodiment and the accompanying figures herewith.

BRIEF DESCRIPTION OF THE DRAWINGS

The invention will be described in conjunction with the accompanying drawings.

DETAILED DESCRIPTION

Interference Mitigation Technique

Referring to the Wireless Signal Modeling description in the Terms and Definitions section above, Sharf and Friedlander (Sharf L. L., B. Friedlander, "Matched Subspace Detectors," IEEE Trans Signal Proc SP-42:8, pp. 2146-2157, August 1994 incorporated fully herein by reference), showed that when the measurement noise variance is unknown, the uniformly most powerful (UMP) test for detecting contribution from H, while rejecting contributions from S is given by:

$$\tau(y) = \frac{y^T P_G y}{y^T P_S^\perp P_G^\perp P_S^\perp y} \quad (3)$$

where:

τ(y) is the Generalized Likelihood Ratio Test (GLRT). That is, the test provided by τ(y) is for determining whether the signal H (i.e., the target signal) is part of the composite signal y. More specifically, the signal H is declared present in y if τ(y) exceeds some appropriately defined threshold.

$P_S = S(S^TS)^{-1} S^T$ is the orthogonal projection operator matrix that would take an input and project it onto the space spanned by the columns of the matrix S.

$P_S^\perp = I - P_S$ is the orthogonal projection operator matrix that would take an input and project it onto the space spanned by the columns of the matrix perpendicular to S.

$G = P_S^\perp H = H - P_S H$ is a matrix whose columns span a subspace that contains those portions of H perpendicular to S. When searching for one signal, the matrix H reduces to a column vector, therefore G reduces to a column vector as well.

$P_G = G(G^TG)^{-1}G^T$ is the orthogonal projection operator matrix that would take an input and project it onto the space spanned by the columns of the matrix G.

$P_G^\perp = I - P_G$ is the orthogonal projection operator matrix that takes an input and projects it onto the space spanned by the columns of the matrix perpendicular to G.

Figure 3:
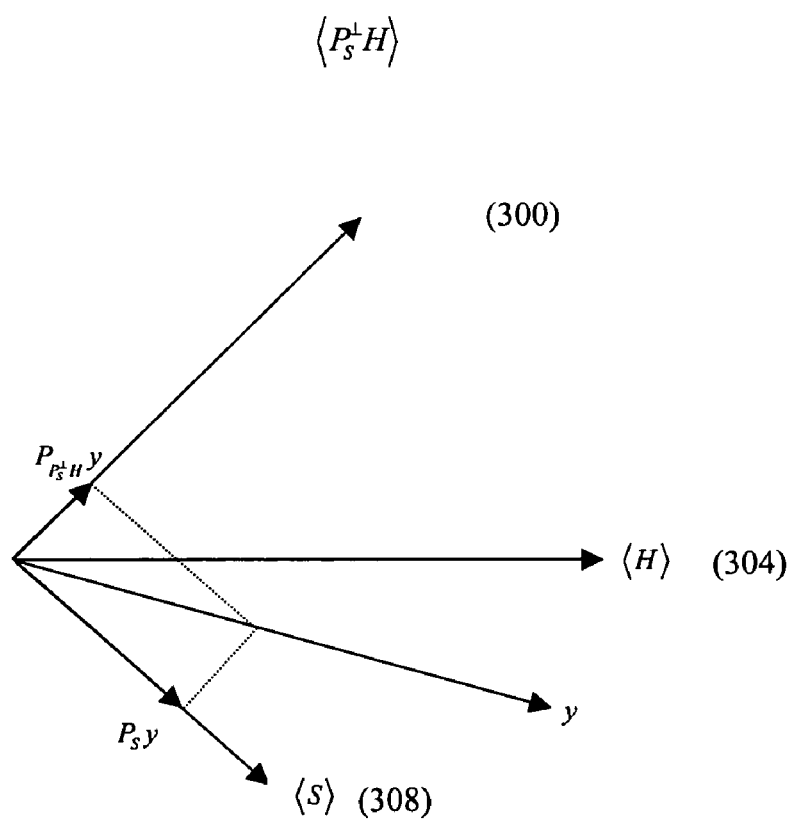
FIG. 3 illustrates signal and interference subspaces and various projections onto them.

Many of the projections are illustrated in FIG. 3. As can be seen from the figure, the subspace 300 corresponds to the detection subspace, and subspace 308 corresponds to the interference subspace and subspace 304 to the signal-of-interest subspace <H>. The interference subspace spans a representation of one or more selected interfering signals and is determined using signal modeling data for the selected interfering signals. The signal "y" refers to a representation of the composite signal received by the antenna, and the subspace 304 is spanned by a representation of the signal of interest (or signal H). As can be seen from FIG. 3, a representation of y is projected onto the detection subspace, which is orthogonal to the interference subspace but non-orthogonal to the signal-of-interest <H> 304 subspace spanned by a representation of the signal of interest, to acquire the signal of interest. The above test using τ(y) has the additional benefit that the performance is invariant to non-negative scalings of y, i.e., multiplyingby a constant does not impact the test. Most RNSS receivers currently use a Matched Filter Detector (MFD) to perform the following computation:

$$z = H^T y \quad (4)$$

to determine if the signal H is present in y, i.e., the signal H is declared present in y if z exceeds some appropriately defined threshold. The present invention involves computing an un-normalized version of Equation 3 that has the form of Equation 4, which is suitable for use in today's RNSS receivers with only minor modifications (if any).

Note that there are normalization terms in both the denominator and numerator in Equation 3. Moreover, the denominator is only a normalization term and is ignored based on the following reasons. In a wireless receiver's tracking stage, (e.g., using FLL, and/or PLL) the ratio of the in-phase and quadrature signal components in the discriminator cancel any scale factor that results from the lack of normalization (e.g., such components included in component 428 of FIG. 4 described herein below). Additionally, in acquisition, computing a properly adjusted detection threshold will also account for the lack of normalization.

The numerator term $y^T P_G y$ of Equation 3 can be decomposed as follows:

$$y^T P_G y = y^T G (G^T G)^{-1} G^T y \quad (5)$$

$$y^T P_G y = y^T G (G^T G)^{-1/2} (G^T G)^{-1/2} G^T y \quad (6)$$

$$y^T P_G y = ((G^T G)^{-1/2} G^T y)^T (G^T G)^{-1/2} G^T y \quad (7)$$

The final form of the numerator term in the above Equation 7 implies that a segment of y is operated on by the term $(G^T G)^{-1/2} G T$. The result is then squared to compute $y^T P_G y$. Clearly, the term that is applied to the segment y is normalized, where the normalization term is $(G^T G)^{-1/2}$. To reiterate, the present invention modifies the computations provided in the Sharf and Friedlander, 1994 reference cited above, and performs an un-normalized operation on the measurement segment, y, by eliminating the term $(G^T G)^{-1/2}$ for the same reasoning that allows the denominator of Equation 3 to be ignored.

Accordingly, the detection test can now be written in a form similar to Equation 4. The resulting operation on y is given by:

$$z = G^T y \quad (7a)$$

Thus, the signal H is declared present in y if $G^T y$ exceeds some appropriately defined threshold.

Recall that $G = P_S^\perp H$ and therefore z from the above equation (7a) can be re-written:

$$z = H^T P_S^\perp y \quad (8)$$

By defining $\tilde{y}$ as:

$$\tilde{y} = P_S^\perp y \quad (9)$$

another form of a detection test similar to the conventional receiver test of Equation 4 is obtained as follows:

$$z = H^T \tilde{y} \quad (10)$$

Note that as per Equation 9, $\tilde{y}$ is the projection of y onto the perpendicular space spanned by the columns of S, which is oblique (i.e., non-orthogonal) to H. In other words, once $\tilde{y}$ has been calculated, the signal with interference S removed, it is simply passed to the standard acquisition and tracking stages.

Phase Invariant Method to Mitigate Interference

To perform a phase invariant MSD, the signal, y, interference, S, and target signal, H, are generally complex, i.e., their real and imaginary parts are in-phase-quadrature couples. Given this, the equations above are also valid for the phase-invariant MSD with the understanding that the T operator which represents a transpose above must be replaced with an adjoint operator, such as a Hermitian transpose.

The phase invariant MSD incorporates phase dependence in interference mitigation by using both the in-phase and quadrature components to represent selected signals. The signal measured at the antenna (y) is represented using in-phase and quadrature (I & Q) signal components. The modeled interference (S) is represented using both I & Q signal components. Finally, the modeled reference signal (H) (the signal of interest), is represented using both I & Q signal components. As before, S and H can be a vector or a matrix of vectors.

When I & Q components are employed to represent a signal, the signal's vectors become vectors of complex numbers. For example, a target signal $h_1$ is composed of a real component ($hI_1$, a column vector containing the in-phase component) and a complex component ($i^*hQ_1$, where $i=\sqrt{(-1)}$ and $hQ_1$=a column vector containing the quadrature component) as follows:

$$h_1 = hI_1 + i^* hQ_1 \quad (11)$$

The construction of H and S matrices then follows as described above, except that complex vectors may be used in place of real vectors.

The phase invariant signal modeling technique is performed after the antenna, and analog-to-digital conversion (ADC) stages in structured signal receivers. The technique can work with various antenna architectures and antenna-based interference mitigation techniques. Such architectures and interference mitigation techniques include multiple antennas, adaptive array, multibeam, and adaptive nulling antennas. The technique can work with various sampling schemes including but not limited to direct RF sampling, IF sampling, baseband sampling (a.k.a. quadrature sampling), and bandpass sampling. The technique can also work with notch filters employed for suppression of narrow-band structured interference.

In contrast, the GPS receiver of U.S. Pat. No. 6,771,214, which is incorporated herein by this reference, discloses interference mitigation techniques requiring explicit knowledge of code offset, Doppler, and phase to model the interference (S) and the reference signal (h). Code offset is usually provided by the Delay Locked Loop or DLL and phase from the Phase Locked Loop or PLL. The change in Doppler when using a PLL is usually obtained by integrating the phase error. The present invention presents a method where phase for the interfering signal(s) can be incorporated implicitly and therefore avoids the use of a tracking loop. The methodology of the present invention can be invariant not only to interference power but also to interference phase.

The phase invariant signal modeling technique can be applied to hardware (e.g., using a logic circuit such as an Application Specific Integrated Circuit), software, and/or firmware receivers. The technique can be implemented in serial, parallel, and/or massively parallel architectures and using both conventional and block processing methods.

Because the phase invariant signal modeling technique requires only that structured interference can be modeled, the technique is applicable to a wide range of problems involving signal detection in the presence of structured interference. These problems include, for example, near-far interference or interference arising from signals having unequal powers, interference signals having powers equal to the signals of interest, and the removal or isolation of specific signals in a composite signal.

The phase invariant signal modeling technique can have a number of other applications. For example, the technique can be used in stationary, dynamic, highly dynamic, ground-based, marine-based, air-based or space-based sensing platforms, whether in monostatic and bi-static remote sensing applications; in co-site interference applications; and, in radio navigation applications. Furthermore, this technique when implemented in a GPS receiver may be integrated with other navigation sensors, including inertial sensors, dopplometers, altimeters, speedometers, and odometers. The technique could enable a signal processing platform to have both a transmitter and receiver operating simultaneously without experiencing unacceptable levels of emitted signal-related noise in the received signal. A remote sensing platform so equipped can eliminate eclipsing in the returns.

Alternate Solution of ỹ

An alternate variant to the solution of ỹ presented in U.S. Pat. No. 6,771,214 is to process y and the S matrix using the Gram-Schmidt process. This process, which is particularly useful for radar and GPS applications, is done iteratively on vector components and thus eliminates the matrix inverse which can be complex to implement in hardware.

This solution requires that the columns of S are normalized, i.e., unit vectors. The following MATLAB code will be used to illustrate this solution:

```
%-----------loop over the number of columns of S
[line 1]      for i=1:numColumns
[line 2]          [val,index]=max(y'*S);
[line 3]          Sbig=S(:,index);
[line 4]          S(:,index) = [ ];
[line 5]          y=y-(Sbiq'*y)*Sbig;
[line 6]          [rowb,colb]=size(S);
[line 7]          Snew=[ ];
[line 8]          for j=1:colb
[line 9]              Snew=[Snew (S(:,j) – (Sbig'*S(:,j))*Sbig)];
%-------------------renormalize S
renormalize S
[line 10]             S(:,j)=Snew(:,j)/norm(Snew(:,j));
[line 11]         end;
[line 12]     end;
``` line 1 will perform the following process a number of times equal to the columns of matrix S, where i is the column identifier.

line 2 is the maximum inner product value of a column of S with y $$\max_j \{y^T S_j \mid S_j \in S\} \tag{12}$$

line 3 is the column of S that corresponds to the max, defined to be $\vec{s}_j$ (or Sbig)

line 4 eliminates that column, $\vec{S}_j$, from the S matrix line 5 calculates the portion of $\vec{y}$ that is orthogonal to $$y = y - (\vec{s}_j^T \vec{y}) \vec{s}_j \tag{13}$$

line 6-11 performs the same calculation on each column of the remaining S matrix $$S = [\vec{s}_1 \vec{s}_2 \ldots \vec{s}_n] \tag{13}$$

$$\vec{k}_k = \vec{s}_k - (\vec{s}_j^T \vec{s}_k) \vec{s}_j \tag{14}$$

As will be appreciated, "rowb" and "colb" refer, respectively, to the number of rows and columns remaining in the S matrix after removal of Sbig. Snew refers to the updated matrix variable.

In line 8, j is a column counter that progressively causes processing of each of the remaining columns, colb, in the S matrix.

line 10 ensures that the columns of S are still unit vectors

ỹ is equal to y after the algorithm is complete.

As can be seen from the two end commands, the code creates two loops, the first is created by line 1 and the second by line 8. The second loop is nested in the first loop.

The preceding MATLAB code should not be taken to be the preferred or optimal instantiation of this technique, for it has been written for clarity. Other instantiations can eliminate the need to normalize some of the vectors. As mentioned earlier this technique eliminates the need to calculate the inverse and is therefore immune to the potential numerical instabilities associated with an inverse. This technique, falls into the optimal class as does the preferred implementation mentioned in patent in Data Fusion Corporation's U.S. Pat. No. 6,771,214, "GPS Near-Far Resistant Receiver". U.S. Pat. No. 6,771,214 dealt exclusively with GPS and GNSS applications. This patent covers the unique applications and modifications needed for additional signal processing domains, including the radar and remote sensing domains.

CDMA NF Interference

In spread spectrum techniques like CDMA, each user is assigned a time varying code that is used to spread each bit in the digital data stream to occupy the entire spectral band allocated to the Multiple Access System (MAS). The different users in such a system are distinguished by the unique spreading codes assigned to each user. In this way, all users simultaneously employ all of the bandwidth during wireless communications.

Each user in a CDMA system uses a unique noise (pseudorandom PN) code to spread the bits. Upon reception, each user's coded signal is compressed using a matched filter that is matched to that user's code to extract the desired bit sequence.

Figure 1:
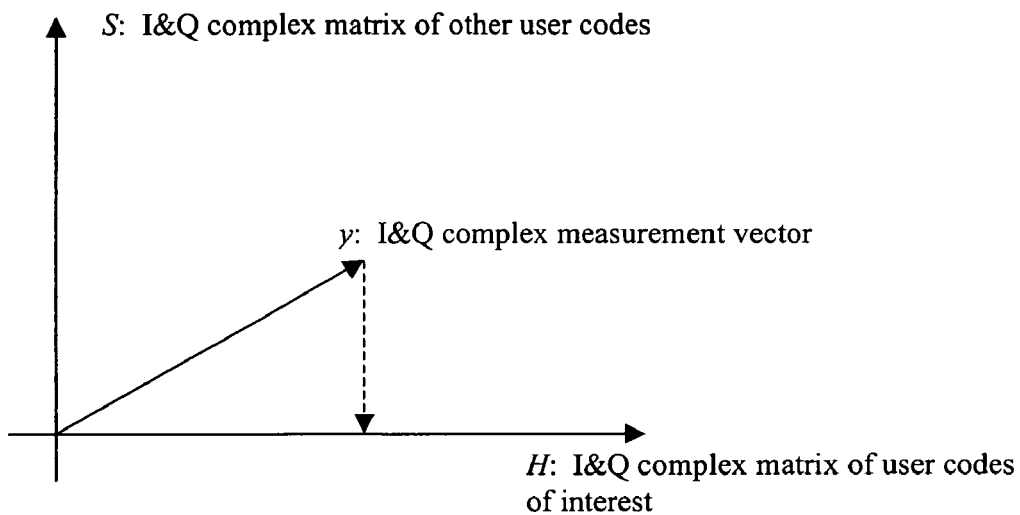
FIG. 1 illustrates a geometric interpretation of matched filtering. Matched filtering is the method used in most commercial GPS receivers produced today. Mathematically the matched filter is H$^T$y.

Ideally the user codes are designed to be perfectly orthogonal when the codes are aligned. Such an alignment of the codes is achieved when there is perfect synchronization. In such a case, the matched filtering operation—which is based on an orthogonal projection—completely nulls out all users except the user of interest. This is illustrated in FIG. 1, where the user code of interest is the vector H that is shown to be orthogonal to S, the matrix of all the other user codes. As shown in this figure, the orthogonal projections of y (a measurement vector of the composite signal) onto H using a matched filter results in perfect cancellation of all contributions from S.

GPS Interference

However, GPS codes are not perfectly orthogonal. In particular, the C/A-code length is only 1,023 chips. So the cross-correlation properties can be poor under certain circumstances (as discussed in Parkinson, B. W., Spilker, J. J., Global Positioning System Theory & Applications, vol-1&2, American Institute of Aeronautics and Astronautics, 1996, incorporated herein by reference). Alternatively, the P(Y) code with $6.1871 \times 10^{12}$ chips is virtually orthogonal for all offsets. However, the problem with P(Y) code is that reception of the full code literally takes a week and the required integration time is computationally staggering. Accordingly, all P(Y) code receivers use significantly shorter code lengths, which again compromises its cross correlation properties.

Figure 2:
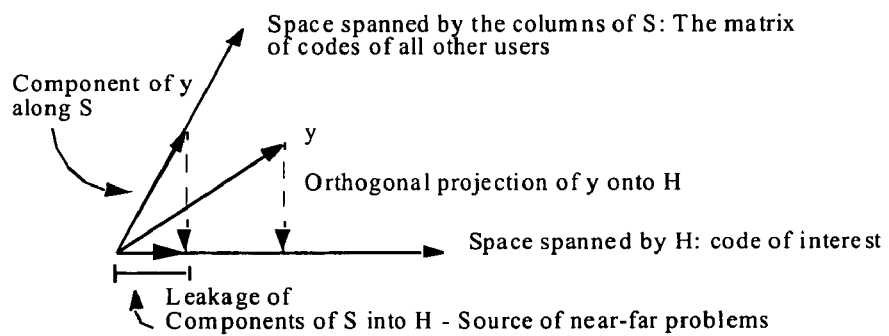
FIG. 2 illustrates the source of interference when using orthogonal projections on non-orthogonal signals.

The non-orthogonality of comingled signals is further exacerbated by asynchronous communications among the receiver and satellites. Therefore the GPS codes will never be perfectly aligned in time. Thus, if a matched filter is used to decode a desired GPS signal from a satellite or PL, signals from other satellite or PL signals will leak into the desired signal channel as shown in FIG. 2.

The signal leakage from other satellites or PLs becomes interference noise against which the desired target signal must be detected. As the interference noise-level increases, the performances of the receiver's detectors degrade. As discussed in the Terms and Definitions section, this effect is commonly referred to as the "near-far" effect.

The present invention may be implemented as a signal processing technique in a radio-navigation receiver. Radio-navigation receivers vary widely in capabilities and design but embodiments of the present invention can be included therein in much the same way regardless of the wireless navigation receiver design. For discussion purposes, FIG. 4 is indicative of many of today's radio-navigation receivers.

Figure 4:
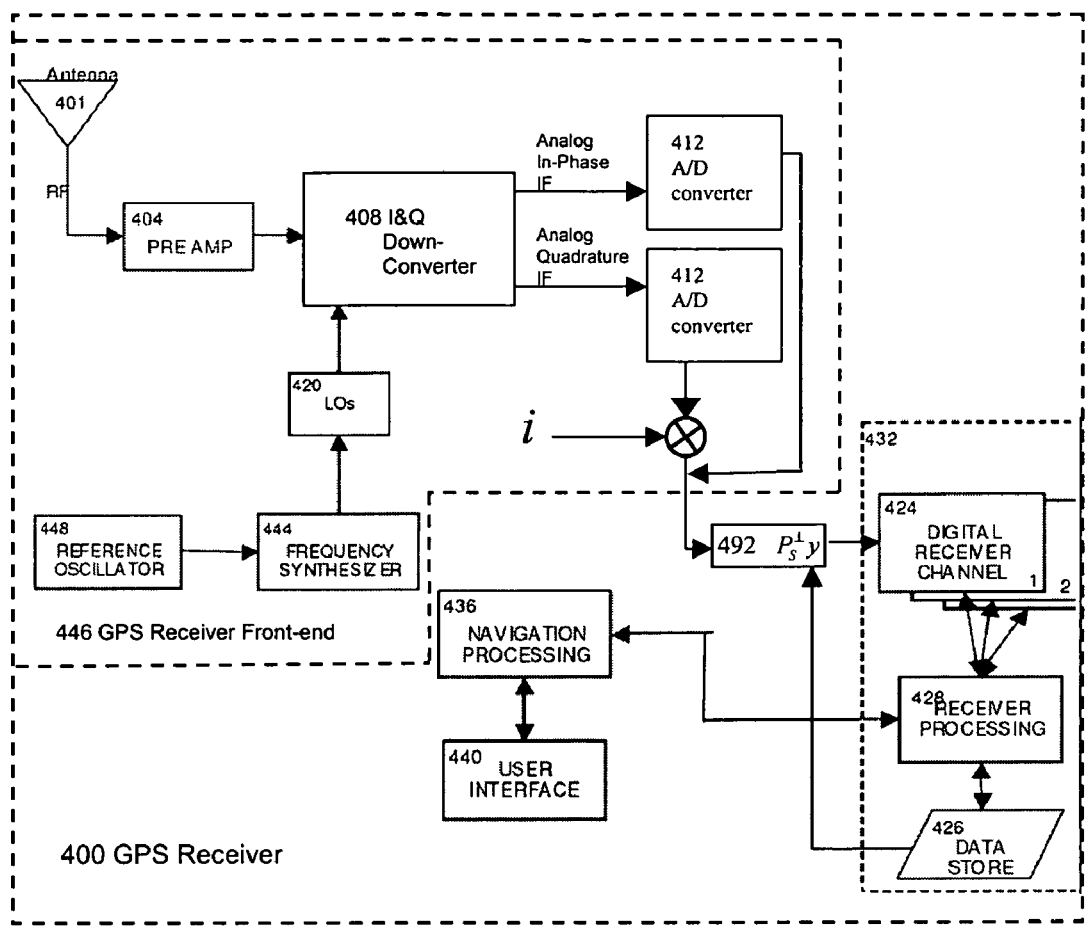
FIG. 4 illustrates a generic digital GPS Block diagram with an Matched Subspace Detector or MSD.

FIG. 4 is a diagram of a generic GPS receiver 400, with the invention included. Note that specific receiver design is usually proprietary. Thus, variations on the diagram of FIG. 4 can include: (i) a GPS receiver that is entirely analog, (ii) a GPS receiver wherein processing is performed in the RF range, and (iii) a different placement of one or more of the pre amp 404, the A/D converter 412, etc. A high level description of the components of the GPS receiver 400 and their signal processing relationship to one another will now be provided.

The GPS radio-frequency signals of all space vehicles (SVs) in view are received by the antenna 401. Typically the antenna 401 is right-hand circularly polarized with nearly hemispherical gain coverage. The RF signals are amplified by a low-noise preamplifier 404. This amplifier is by far the major contributor of noise to the receiver 400. In some implementations a passive bandpass filter is located between the antenna 401 and the preamp 404 to remove out-of-band RF interference. The amplified and signal-conditioned RF signals are then down converted, via the down converter 408, using signal mixing frequencies from local oscillators 420 (LOs). For the present invention, the down conversion must produce a complex signal by demodulating with both a cosine and a sine term. The input frequencies to the LOs 420 are derived from the reference oscillator 448 via the frequency synthesizer 444 based on the frequency plan of the particular receiver design. There may be one LO 420 per down converter 408. The upper sidebands and leak-through signals are passed through a postmixer bandpass filter (not shown) of the down converter 408 to complete the down conversion process. The analog to digital converter (ADC) operates at IF or baseband. The digital signal is then split once for each channel, and the signal for each channel is passed through a MSD 492 to have the interference removed. From here the channel signals are passed to the normal N digital receiver channels 424. Using the output from MSD 492 each receiver channel 424 performs the acquisition functions and the code and carrier tracking loops (i.e., delay locked loop (DLL), frequency locked loop (FLL), and phase locked loop (PLL)) for a single SV or PL. Or, depending on the receiver, the digital receiver channels primarily perform the correlation operations and work with the receiver processing component 428 for implementing loop discriminators and filters, data demodulation, meters, phase lock loops, and so forth. Additionally, the receiver processing component 428 may store various types of data in, e.g., a data store 426 for each channel 424 which is tracking a signal. This data store is shared amongst all the channels 424. After the data obtained from the GPS signals has been demodulated it is passed to the navigation processing component 436 and the position, velocity and time (PVT) solution is calculated, and displayed 440.

Within a receiver 400, an embodiment of the present invention may be incorporated into the receiver channel(s) 424 and the receiver processing component 428. For a digital implementation, however, the present invention requires that the dynamic range of the ADC 412 be sufficient to capture all the signals of interest, including the interference. Similarly components 424 and 428 may need to be modified or replaced depending on the dynamic range of the ADC 412 and the requirements of the invention (e.g., the data store 426 and additional processing capabilities).

The processing channels 432 (FIG. 4) identifies the components within which the present invention is, in at least one embodiment, incorporated. For each interference mitigation performed by the present invention, the data store 426 stores the following parameters: (a) a pseudo-random number, (b) code offset data obtained from the delayed lock loops (DLL), or Kalman filter, (c) Doppler data obtained from the frequency locked loop (FLL) or Kalman filter, and (d) at least one bit that can be toggled between being set and being unset depending on whether the its corresponding GPS signal has been labeled an interferer or not. As noted, the data store does not store phase data obtained from the PLL. This is different from the receiver of U.S. Pat. No. 6,771,214.

When near-far interference effects occur, the above identified parameters (a) through (d) are usually sufficient to model the interference of each dominant interfering GPS signal. In a more demanding situation (e.g., relatively lower power interferers), a Kalman filter or higher order DLLs, FLLs and PLLs (as described in the Terms and Definitions section above) may also be used to provide code offset rate, and Doppler rate to model the interference signals more accurately when provided with the output of the A/D converter 412. Note that it is within the scope of the present invention to obtain such parameters by other techniques as well, e.g., a massively parallel acquisition scheme (as described in the Terms and Definitions) may provide the required modeling parameters at the fidelity necessary.

Identification of Interfering Signals

The invention predictively models identified interfering signals. In GPS NF situations, the interference includes one or more SV's (and/or PL's) pseudo-random noise code (PRN). Such interference can be predictively modeled, since all GPS signals can be predictively modeled (in that the structure of such signals is well known and accordingly can be substantially reconstructed from such signal modeling parameters as identified hereinabove). In some situations, such signals may be known a-priori, in which case the standard baseline receiver 400 architecture of FIG. 4 can acquire and track such interferers normally (i.e., as any other GPS signal), and then the procedure of FIG. 7 (described herein below) can be used to acquire and track each desired nominal (i.e., non-interference) signal by canceling out the a-priori interferers. If the interfering PRN signals are not known a-priori, the procedures of FIG. 5 and FIG. 6 (also described herein below) have been demonstrated to cancel the interferers in GPS.

Figure 5:
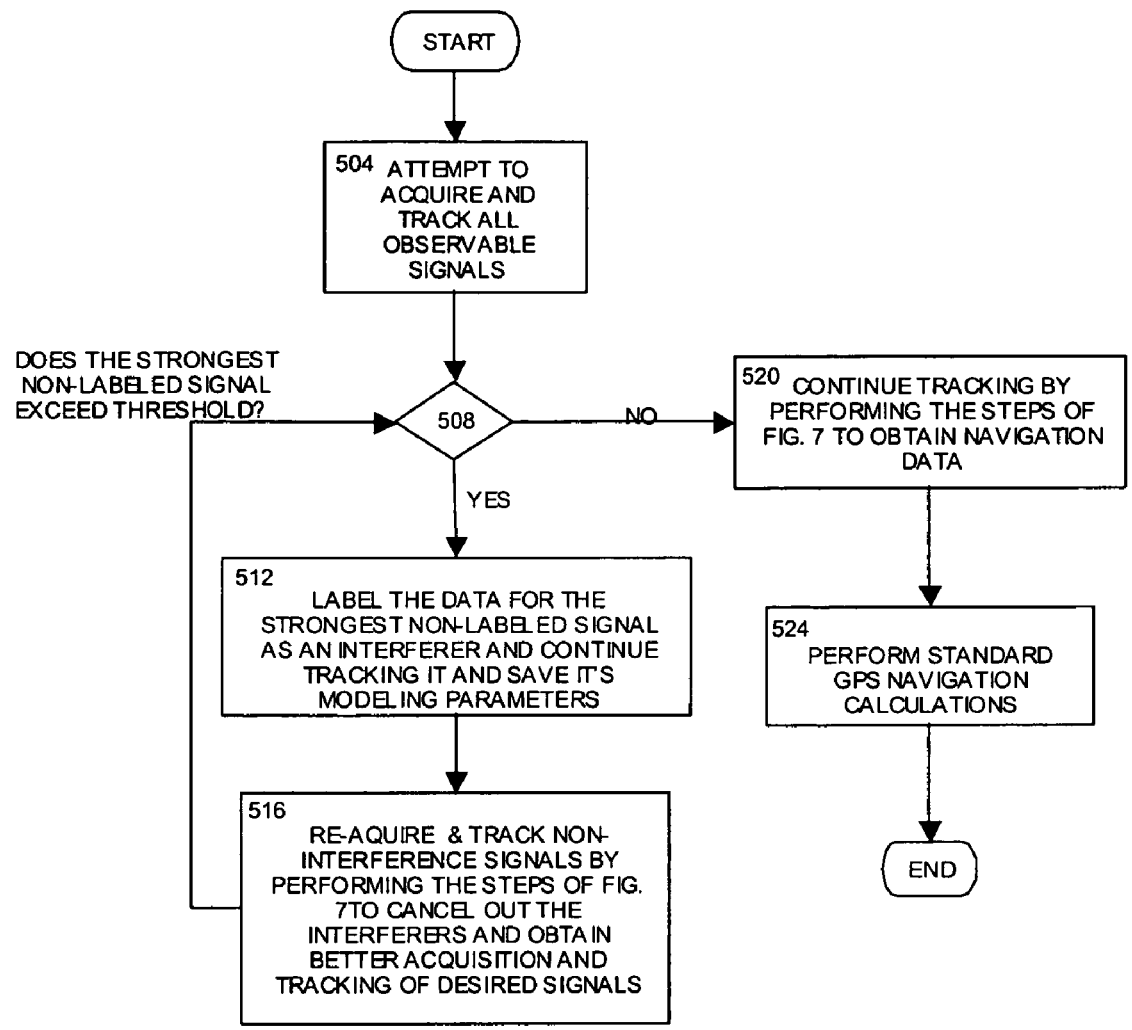
FIG. 5 illustrates an iterative procedure to determine interferers.

In extreme cases of NF interference, the signal power levels (from distinct GPS signaling sources) are dramatically different from each other, (e.g., one PL's signal, call it PL1, might be 20 dBW above the nominal satellites' signals (i.e., GPS constellation satellites operating normally) and another PL's signal, call it PL2, might be 20 dBW above that of PL1). In this situation, the interferers must be iteratively identified from highest power to lowest power as FIG. 5 illustrates. Note that the procedure of FIG. 5, in general, takes more elapsed time to accomplish than the procedure illustrated in FIG. 6 but tends to be more robust.

A description of the steps of FIG. 5 follows. Note that these steps refer to the components of FIG. 4; however, it is to be understood that the A/D converter 412 and the components of the interference processing channel 432 must include the requisite functionality to perform these steps (as well as the steps of FIG. 7),

| | |
|---|---|
| Step 504: | The receiver 400 attempts to acquire and track all observable GPS signals. This is primarily done using a standard GPS acquisition and tracking functions components 424 & 428. |
| Step 508: | Once the signals that can be tracked have achieved 'good' lock, (i.e., the estimate of Doppler offsets is varying within an acceptable range), the most powerful signal is compared to a threshold criterion or threshold criteria (without loss of generality, henceforth referred to in the singular). This threshold criterion may be as simple as identifying the strongest M of N signals as presumed interferers, or the threshold criterion could be based on design specifications such as those of USCG", Navstar GPS Space Segment/Navigation User Interfaces", ICD-GPS-200C incorporated herein by reference. (E.g., the threshold could be a predetermined power level value, such as 10 dBW, above the user minimum received power using a 3-dB gain linearly polarized antenna. The specified user minimum received power for L1 C/A-Code is –160 dBW, for L1 P(Y)-Code is –163 dBW and for L2 P(Y)-Code or C/A-Code is –166 dBW). This threshold criterion, in some embodiments, may be defined as a value corresponding to a signal to noise ratio (SNR), or signal to carrier ratio (SCR), or carrier to noise ratio (CNR), relative amplitude, or some combination of such values (e.g., a weighted sum thereof or a series of threshold tests wherein each test uses at least one of these ratios). Note that the Parkinson, B. W., Spilker, J. J., 1996 reference cited hereinabove (and incorporated fully herein by reference) details such a method for combining such values. |
| Step 512: | Any signal exceeding (or violating) this threshold criterion is labeled as an interferer (i.e., the data representing such a signal is accordingly labeled such as by toggling the bit field (d) of the modeling parameters described hereinabove). This labeled interferer continues to be tracked and it's current Doppler and code offset are saved in the data store 426. |
| Step 516: | All signals that have not yet labeled as interferers are then re-acquired and tracked by invoking FIG. 7 to cancel out all labeled interferers to obtain better acquisition and tracking of the desired signals. Control then passes back to step 508. |
| Step | After all the interfering signals have been labeled, and all the non- |

| | -continued |
|---|---|
| 520: | interfering signals have achieved good lock, the receiver enters what is denoted wherein as a 'steady state'. Tracking continues for all channels by, again, performing the procedure described in FIG. 7, and the navigation data is demodulated. |
| Step 524: | Once sufficient navigation data has been demodulated, the desired navigation solution (e.g., PVT) can be computed via the navigation processing component 436. |

Figure 6:
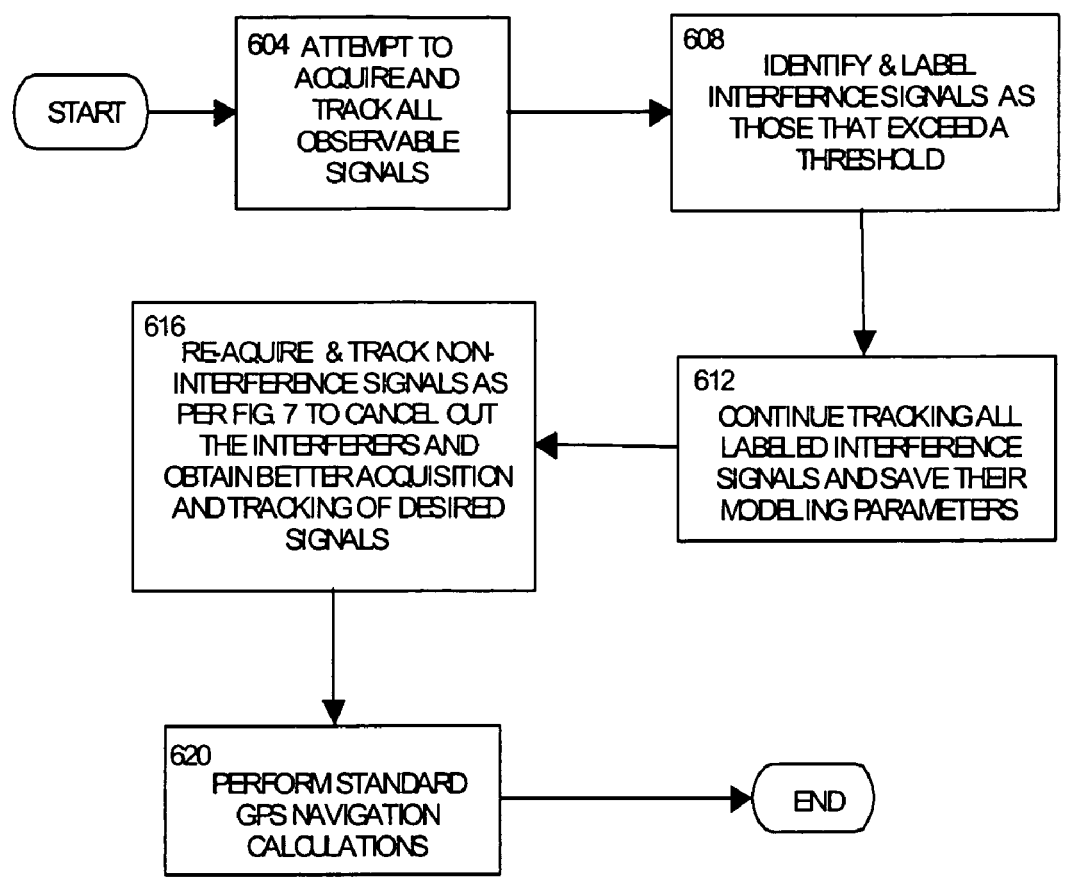
FIG. 6 illustrates a procedure to determine interferers all at once.

FIG. 6 is similar to FIG. 5 except that the identification (i.e., label) of all initial interferers is done at one time. (FIG. 5 demonstrated an iterative scheme that identified interferers from highest power downwards). This procedure has been shown to be useful in cases when all the interfering GPS signals have roughly of equal power.

| | |
|---|---|
| Step 604: | The receiver attempts to acquire and track all observable GPS signals. This is primarily done using the standard GPS acquisition and tracking functions components 424 and 428. |
| Step 608: | Once the signals that can be tracked have achieved 'good' lock, (i.e., the estimate of Doppler offsets is varying within an acceptable range, the most powerful signal is compared to a threshold criterion or threshold criteria (without loss of generality, henceforth referred to in the singular). This threshold criterion may be as simple as identifying the strongest M of N signals as presumed interferers, or it could be based on design specifications such as those of ICD-GPS-200C identified hereinabove (e.g., 10 dBW above the user minimum received power using a 3-dB gain linearly polarized antenna. The specified user minimum received power for L1 C/A-Code is –160 dBW, L1 P(Y)-Code is –163 dBW and L2 P(Y)-Code or C/A-Code is –166 dBW). This threshold criterion, in some embodiments, may be defined as a value corresponding to a signal to noise ratio (SNR), or signal to carrier ratio (SCR), or carrier to noise ratio (CNR), relative amplitude, or some combination of such values (as in step 508 above). |
| Step 612: | Any signal exceeding this threshold is labeled as an interferer. These labeled interferers continue to be tracked and their current Doppler and code offset are saved in the data store 426. |
| Step 616: | All signals that are not labeled as interferers are then re-acquired and tracked by invoking the steps summarized in FIG. 7 to cancel out all labeled interferers and thereby to obtain better acquisition and tracking of the desired signals. The navigation data is demodulated. |
| Step 620: | Once sufficient navigation data has be demodulated the navigation solution can be computed 436. |

Figure 7:
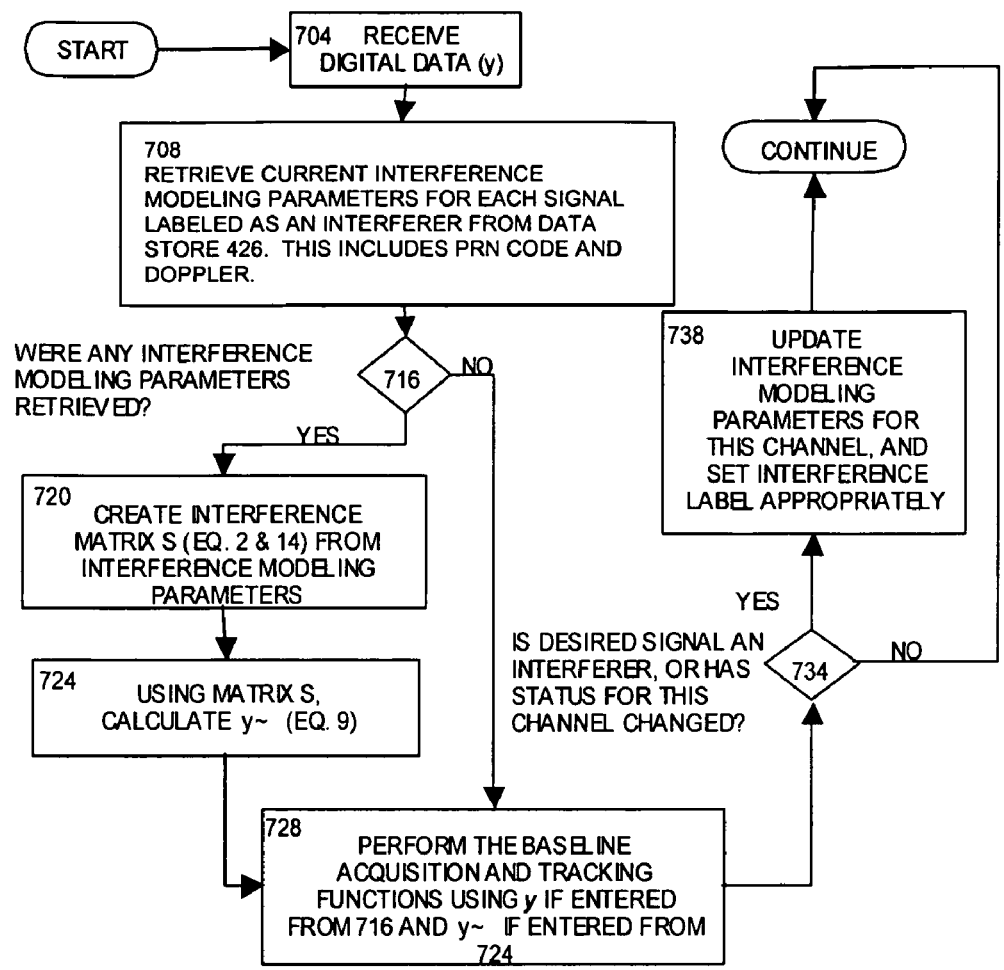
FIG. 7 shows a flowchart of actions performed by a single processing channel in an interference resistant GPS receiver in steady state operation. This processing channel is included in a digital receiver channel 424 and a portion of the receiver processing component 428 in FIG. 4.

FIG. 7 shows a high level process diagram of the operation of the signal interference mitigation method and apparatus of the present invention, during steady state. Steady state is defined in the Terms and Definition section above. The steps of FIG. 7 may be described for a GPS embodiment as follows:

| | |
|---|---|
| Step 704: | Digital data y (as described in Interference Mitigation Technique section above) is provided to the interference processing channel432. As mentioned earlier this data could be IF or RF, but it must be complex with the imaginary and real parts being in-phase quadrature pairs. In FIG. 4 the data y is received by the antenna 401 and then passed to the pre-amp 404 for amplification. Assuming the GPS radio-navigation signal y is then down converted, via down converter 408, to an intermediate frequency (IF) and passed through to the A/D converter 412 for digitally sampling. The number of bits in the A/D converter 412 must be sufficient to capture all signals of interest, including the interference signals. Accordingly, for an embodiment of the receiver 400 to capture, e.g., 7 to 8 signals differing by +33 dB, the number of bits in a linear A/D converter 412 is at least 8 bits. Note that when near-far interference effects occur, the power of at least one interfering signal is significantly higher than any non-interfering (nominal) GPS signals, thus requiring the A/D converter 412 to utilize such a range of bits to be able to acquire |

-continued and track the weaker signals. It is the relative power difference that is important, (e.g., nominal signals could be the NF interference to extremely weak signal as well). A GPS receiver needs at least 1 bit to acquire and track a GPS signal in thermal noise. After passing through the ADC 412, the IF signal is fed to all processing channels.

Step 708: Retrieve the current interference modeling parameters from the data store 426 having interference modeling parameters for all the interference processing channels 432. Note, there may be no current interferers, or there may be one or multiple interferers. All the interference modeling parameters (for signals that have labeled as interferers) that exist in the data store 426 are retrieved.

Step 716: If any interference modeling parameters are retrieved in step 708, then control is passed to 720, else control goes to 728.

Step 720: The interference modeling parameters are used to create an in-phase and quadrature complex interference reference signals which have the form:
$$s_{iCA}(\omega t) = [G_i(t)]e^{i\omega t} \quad (15)$$
where:
$G_i(t)$ is the Coarse Acquisition (C/A) code's ith chip at time t (used in the Standard Positioning System (SPS))
$\omega$ is the carrier frequency.

Once the interference signal of each interference PRN is created, the complex interference signals are assembled into a matrix, S, as in equation (2) of the Wireless Signal Model description in the Terms and Definitions section hereinabove. Note, the desired signal (for which interference is being removed) will not be part of S even if it is identified as an interferer. This rule even applies to multipath, and other jamming signals.

Step 724: Once S has been calculated, ỹ is determined as per equation (9), thereby removing the interference characterized by the interference modeling parameters.

Step 728: Perform conventional acquisition and tracking functions. If this step was entered from step 724 use ỹ (for computing Equation 10) and if this step was entered from 716 use y (for computing Equation 4).

Step 734: The desired signal is compared to the interference threshold criterion that was used in 508 or 608. If the classification of the desired signal is still labeled as an interferer (based on info from the data store 426), or if it has changed from being an interferer to a non-interferer control will pass to step 738, otherwise control of the interference processing channel 432 passes to the next step of FIG. 5 (or FIG. 6) following the current activation of FIG. 7.

Applicants have observed that a potential interfering signal should exceed (or violate) the threshold criterion for at least twenty times in a row before its classification should be changed and therefore labeled an interferer (or unlabeled thereby designating that it is not an interferer). This prevents the signal's classification from being changed mistakenly due to a noise spike or a navigation bit flip.

Step 738: Update the desired signal's (this channel's) current interference modeling parameters to the data store 426 of all the interference processing channels. Note such updates include: (i) removing a labeling of the desired signal as an interferer if this signal remains below the threshold criterion consistently, and (ii) labeling the desired signal as an interferer if this signal was consistently above the threshold criterion or just updating the current signals interference modeling parameters.

A Single Processing Channel Illustrated

Figure 8:
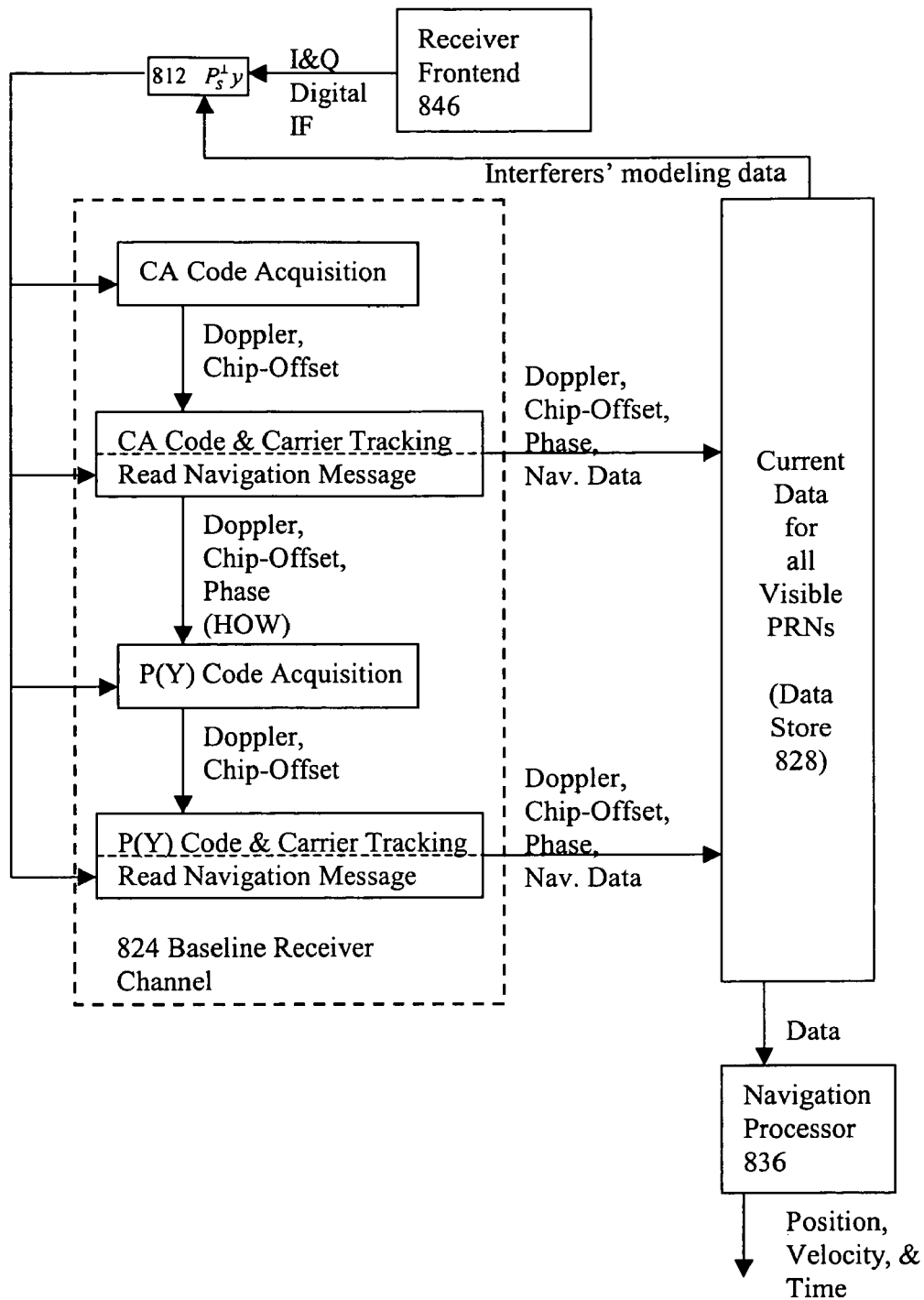
FIG. 8 illustrates one of many channels of the proposed invention.

FIG. 8 illustrates a single receiver channel. A GPS receiver commonly has many such channels, e.g., all in sky receivers typically have at least 12 channels. Both the inphase and quadrature components of the signal from the Receiver Frontend 846 is split and passed to each channel's MSD 812. The Doppler and chip-offset parameters for each interfering PRN are passed to the MSD 812 from the universal Data Store 828. Once the interference has been removed, the signal is passed to a baseline receiver channel 824. Each channel performs a matched filter for a single PRN. Traditionally, first C/A code acquisition is performed. Then tracking is performed using the Doppler and chip-offset measurements from the acquisition step. The parameters from the tracking step are passed to the Data Store 828 and used in P(Y) code acquisition. Finally, P(Y) tracking is performed, and the resulting output is stored in the Data Store 828. At any time, the Navigation Processor 836 can use the data in the Data Store to determine the receiver's position, velocity, and time. FIG. 8 can also be used for other GPS signals and codes. For example, the receiver could directly acquire the P(Y) code, or M-code, etc.

Application to GPS Precise Positioning System

The present invention is directly applicable to all known GNSS codes. For example, applying this invention to the Precise Positioning System (PPS) as well as the Standard Positioning System (SPS) using the CA code discussed above. The GPS signal structure for the L1 frequency looks like:

$$L1_i(\omega t) = A[P_i(t) \oplus D_i(t)] \cos(\omega t) + \sqrt{2}A[G_i(t) \oplus D_i(t)] \sin(\omega t) \quad (16)$$

where:
A is the amplitude
$P_i(t)$ is the Precise [P(Y)] code's $i^{th}$ chip at time t [used in PPS]
$D_i(t)$ is the nav data's $i^{th}$ bit at time t
$G_i(t)$ is the Coarse Acquisition [C/A] code's $i^{th}$ chip at time t [used in SPS]
$\omega$ is the carrier frequency As can be seen, the C/A code is 3 dB stronger than the P(Y) code. If a receiver 400 is sampling the signal at a rate sufficient for CA code, then the P(Y) will appear as noise 3 dB less than the original interference signal. Long coherent integration can mitigate the effect of the strong P(Y) code noise.

If a PPS GPS receiver is being used, the sampling rate will be 10 times higher than the sampling rate needed for the CA code. Most GPS receivers acquire and track the CA code and use the information in the navigation message to 'jump' into the P(Y) code. It is also possible to directly acquire the P(Y) code, as one of ordinary skill in the GPS field understands.

Figure 9:
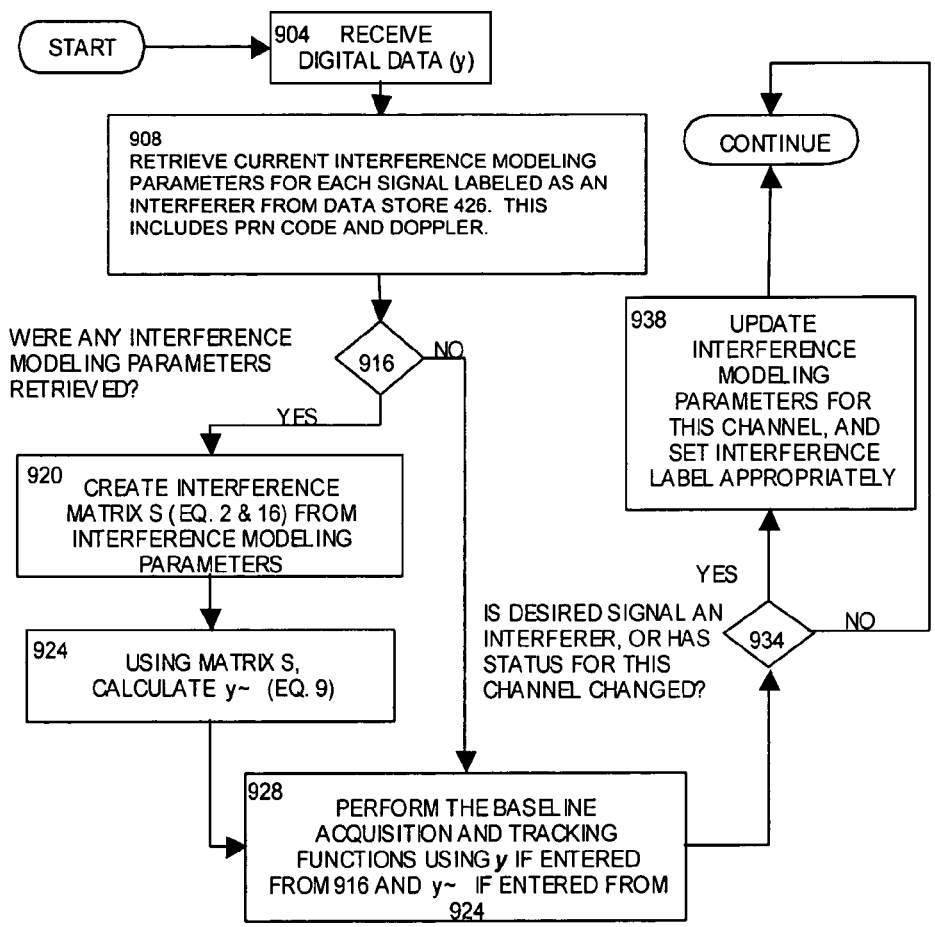
FIG. 9 illustrates an embodiment of the interference resistant processing channel in which both CA and P(Y) codes are processed.

Because of the higher sampling rates the noise/interference from the P(Y) code can now be removed. The interference associated with the P(Y) code can be removed in exactly the same way as was done for the CA code. This process is illustrated in the flowchart of FIG. 9 whose steps will now be described:

Step 904: Digital data y (as described in Interference Mitigation Technique section above) is provided to the interference processing channel 432. As mentioned earlier this data could be baseband, IF or RF. There are numerous possible designs for a RF front end, the important point is that this invention obtains complex digital data from the front end. This digital data is then split and passed to the receivers various channels.

Step 908: Retrieve the current interference modeling parameters from the data store 426 having interference modeling parameters for all the interference processing channels 432. Note, there may be no current interferers, or there may be one or multiple interferers. All the interference modeling parameters (for signals that have labeled as interferers) that exist in the data store 426 are retrieved.

Step 916: If any interference modeling parameters are retrieved in step 908, then control is passed to 920, else control will go to 928.

Step 920: Once the P(Y) code and the CA code tracking loops are both locked onto the signal, the interference to both components can be removed at the same time. The interference modeling parameters are used to create an in-phase and quadrature complex reference signals which have the form:

$$s_i(\omega t) = P_i(t)e^{i\omega t} + G_i(t)e^{i(\omega t \frac{\pi}{2})} \quad (17)$$

-continued

| | |
|---|---|
| | where the variables have the same meanings as described in step 720. Once the interference signal of each interference PRN is created they are assembles into a matrix, S, as in equation (2) (of the Wireless Signal Model description in the Terms and Definitions section hereinabove). Note, the desired signal will not be part of S even if it is identified as an interferer. This rule even applies to multipath and multipath-like signals. |
| Step 924: | Once S has been calculated, ȳ is determined as per equation (9), thereby removing the interference characterized by the interference modeling parameters. |
| Step 928: | Perform conventional acquisition and tracking functions. If this step was entered from step 924 use ȳ and if this step was entered from 916 use y. |
| Step 934: | The signal is once again compared to the interference threshold. If the signals classification is still labeled as an interferer or it has changed from being an interferer to a non-interferer control will pass to step 938 else the control interference processing channel and baseline receiver function will continue. As mentioned above, step 734, applicants have observed that a potential interfering signal should exceed (or violate) the threshold criterion for at least twenty times in a row before its classification should be changed and therefore labeled an interferer (or unlabeled thereby designating that it is not an interferer). This prevents a signal's classification form changing mistakenly due to a noise spike or a navigation bit flip. |
| Step 938: | Update the desired signal's (this channel's) current interference modeling parameters to the data store 426 of all the interference processing channels. Note such updates include: (i) removing a labeling of the desired signal as an interferer if this signal remains below the threshold criterion consistently, (ii) labeling the desired signal as an interferer if this signal was consistently above the threshold criterion or (iii) just updating the current signals interference modeling parameters. |

Interference Subspace Discriminator when the Receiver is Operating in Steady State Mode Optimum performance of the present invention is achieved by treating all known signals except for the current channel's signal as interference, and building the S matrix appropriately. A simple suboptimal embodiment of the invention may be created that allows for good performance with lower computational requirements. This is accomplished by building the S matrix with only the n highest-powered signals (not including the current channel's signal) where n is the number of interferers and is limited by computational constraints.

In other words, for a selected signal, the corresponding identified group of interferers contains only the signals having powers exceeding, by a selected threshold (which may be zero), the power of the selected signal. Interference from signals having powers weaker than the selected signal generally is not a significant obstacle to tracking and acquiring the selected signal. Because the set of interferers contains fewer members relative to the other embodiments of the invention, the embodiment, though being suboptimal, can provide a substantial savings in computational requirements.

Figure 10:
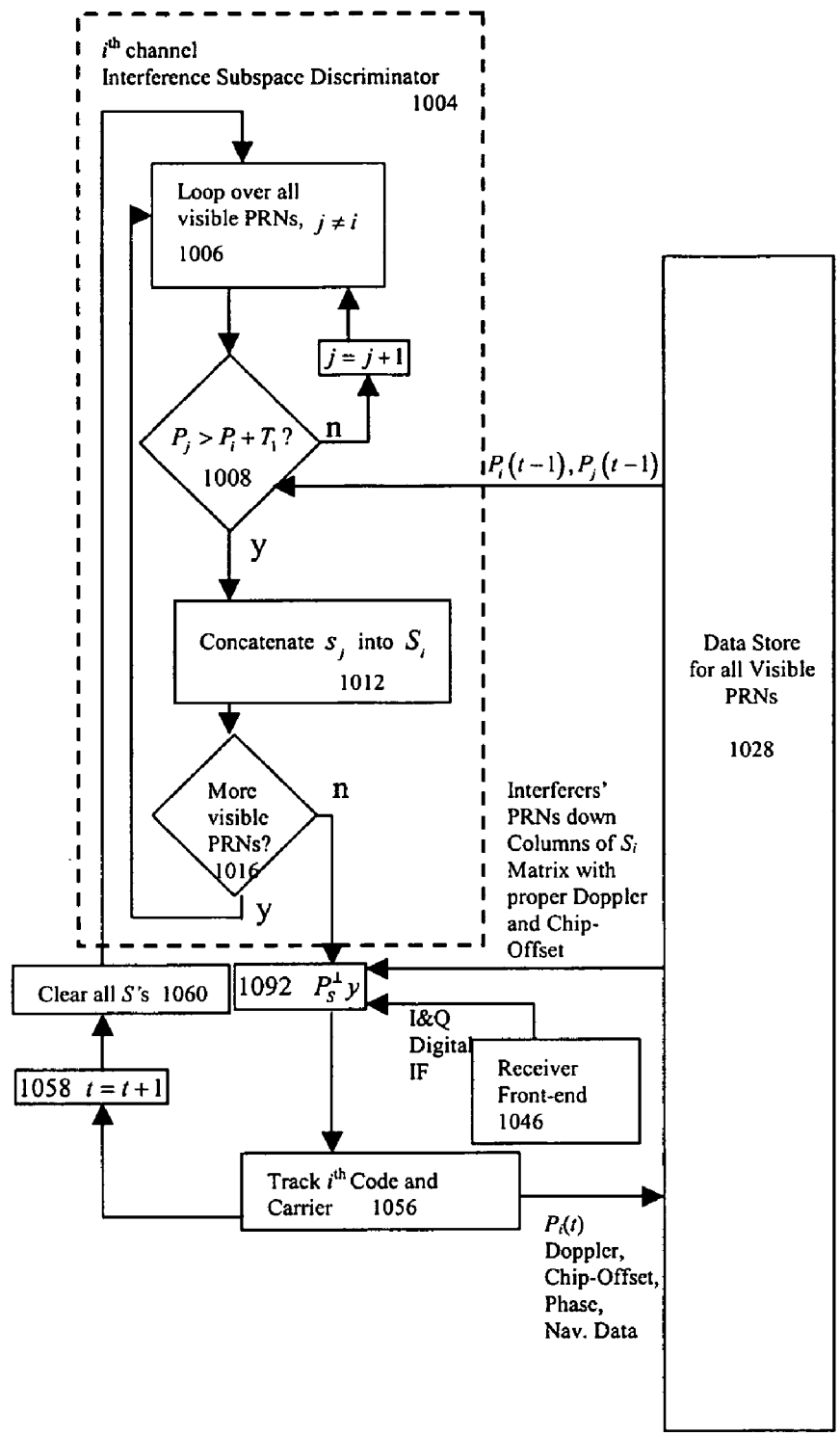
FIG. 10 depicts the control logic for the Interference Subspace Discriminator for the i$^{th}$ PRN when the receiver is operating in steady state.

Since the number of channels and computational power are limited, control logic was designed to remove interference efficiently when operating in steady state mode. This method was designed to minimize computational intensity without harming performance. This technique based on the relative post correlation observed powers of the various signals. The procedure for the Interference Subspace Discriminator 1004 is shown in FIG. 10. Each channel will be processed in parallel, and the steps for the $i^{th}$ channel are detailed below:

| | |
|---|---|
| Step 1006: | Loop over all visible PRNs, j ≠ i, where i and j are channel identifiers, with each channel being associated with a different signal. |
| Step 1008: | Retrieve parameters for the ith and jth PRN from the Data Store 1028 for the previous time-step. If the power of the jth channel is greater than the power of the ith channel to within some threshold (to be determined by the specific situation), then the jth PRN is treated as an interferer and added to the interference matrix for the ith PRN 1012. Otherwise, it is ignored. This step is repeated for all visible PRNs, j ≠ i. |
| Step 1092: | The newly created interference matrix, S, from the Interference Subspace Discriminator 1004 is used with the signal from the Receiver Frontend 1046 and the interference it mitigated in the MSD 1092. |
| Step 1056: | The code offset and Doppler of the ith signal is tracked, and the output parameters (power, Doppler, chip-offset, phase, and navigation data) are sent to the Data Store 1028. |
| Step 1058: | The time step is incremented. |
| Step 1060: | The interference matrix for the ith signal is deleted, and control is returned to the Interference Subspace Discriminator 1004. |

Initializing and Populating the Data Store

Figure 11:
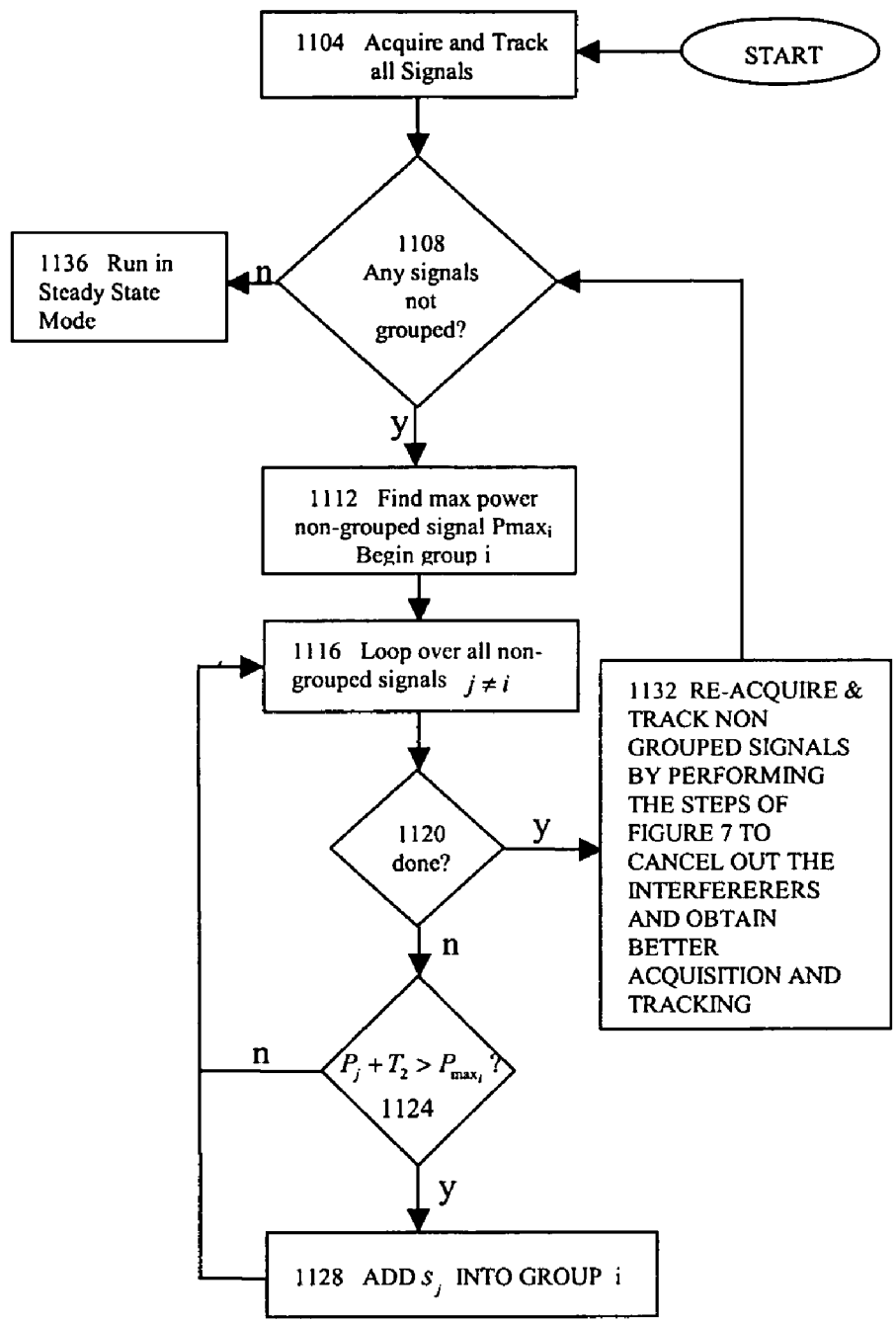
FIG. 11 shows the control logic that can be used to initialize the Data Store and prepare the receiver for steady state operating mode.

Before the receiver can operate in steady state mode, it must first initialize and populate the Data Store with most of the visible PRNs. FIGS. 5 & 6 can be used to populate the Data Store. In another embodiment of the invention the following logic can be also be used to build the Data Store. In general, the logic, after initial signal tracking and acquisition, identifies the "hottest" signals, or the signals having the highest powers, and groups the signals in a first signal grouping. Using the nonorthogonal projection algorithm above, the logic then removes, from the composite signal, the interference attributable to the grouped signals, and tracks and reacquires the ungrouped signals. The "hottest" of the tracked and acquired signals (or the signals having the highest powers among the ungrouped signals) are then grouped in a second signal grouping (having a different membership than the first signal grouping). The interference from the members of both the first and second signal groupings are removed from the measured composite signal and the process repeated until no ungrouped signals remain. Typically, the powers of the signals within any signal grouping fall within a specified or predetermined signal power range, with the various groups having no overlapping signal ranges. This process is shown in more detail in FIG. 11. Referring to FIG. 11:

| | |
|---|---|
| Step 1104: | Attempt to acquire and track all known signals in the receiver's radio spectrum. Alternatively one could just attempt to acquire and track known signals visible to the receiver. |
| Step 1108: | Have all the signals been grouped based upon their relative powers? These groupings will be used to guide the interference mitigation. |
| Step 1112: | Find the non-grouped signal with the maximum post correlation power. Begin group i and add modeling parameters to the group. |
| Step 1116: | Loop over all the remaining non-grouped signals. |
| Step 1120: | Have we finished looping over all the non-grouped signals? |
| Step 1124: | Determine if the signal j is in the ith power grouping. |
| Step 1128: | Add this signal's modeling parameters to the ith power group. |
| Step 1132: | Re-acquire and track all non-grouped signals by performing the steps of FIG. 7 to Cancel out the interferers and obtain better acquisition and tracking. This will be done using the known interference power groups. Specifically, interference to a particular |

| | |
|---|---|
| | -continued |
| | signal is all the power groups having a higher power than the group that the particular signal is in. |
| Step 1136: | The receiver is now in steady state. The receiver will transition to steady state power control logic. |

Application to Anti-Jamming in GPS

If GPS receivers are in a jamming interference environment the present invention provides interference resistance that can be used to eliminate jamming from structured interference. The jamming signal is simply acquired, tracked, and then eliminated from the composite signal by the present invention.

Mitigation of Self Interference in GPS

Self interference is when a GPS transmitter and receiver are substantially colocated. The application of the present invention to mitigate self-interference is actually more accurate than in the standard interference resistant GPS receiver. The reason for this is rather than estimating the interfering GPS signal's offset and Doppler from the tracking loops, this data is supplied exactly by the GPS receiver enhanced according to the present invention.

Application to WAAS and LAAS Landing Systems

Precision navigation and landing systems require reliable and highly accurate position, velocity and time (PVT) information not achievable by standalone GPS. To meet these requirements additional GPS transmitters are needed to improve the accuracy. These additional transmitters can be additional satellites as specified in the Wide Area Augmentation System (WAAS) or PLs based on the ground as specified in the Local Area Augmentation System (LAAS), or on board ships, or even Unmanned Aerial Vehicles (UAV) loitering in the air above an area of interest. WAAS and LAAS can transmit either GPS correction data (i.e., GPS differential data) or provide additional ranging information. For such applications, PLs can be used for Carrier-Phase Differential GPS navigation, resulting in a potential range precision of about 1 mm (as recited in Elrod, B. D., Van Dierendonck, A. J., "Pseudolites", Ch 2. pg 51 in Global Positioning System: Theory and Applications, Volume II, Ed by B. Parkinson, et al, 1996). When these transmitters use the GPS spectrum, as is the case for UAVs, PLs, and satellites providing ranging information, additional constructive interference is added. In the case of landing systems, a GPS receiver that is too near any one of the PLs will suffer interference. This effectively "drowns out" the reception from the other PLs as well the other GPS satellite signals. When this happens, the GPS receiver will be unable to track the satellites and therefore will be unable to provide PVT information. This is the Near-Far effect. Numerous solutions have been proposed and investigated to mitigate the PL interference, including pulsing the PLs. None of these solutions are as effective as the present invention.

In particular, the present invention is different from the "pulsing" PL solution described in the Elrod & Dierendonck reference cited above. The Pulsed PL technique with 10% duty cycle (transmitting 93 out of 1023 chips each cycle of the PL signal) may result in a 10 dB improvement in signal to interference level. This amount of improvement was suggested in Stansell, T. A., "Recommended Pseudolite Signal Specification," in Global Positioning System, vol-3, Institute of Navigation, 1994 also fully incorporated herein by reference. Such a 10 dB improvement is not sufficient in radio environments where PL signals are >30 dB higher than nominal GPS satellite signals. Moreover, if multiple PLs are used, then it becomes harder to maintain time slots for each of the PLs and also the oscillators of the PLs have to be very stable. This is discussed in Parkinson, B. W., Spilker, J. J., 1996 referenced above. It is important to note, however, that the present invention can also be used in conjunction with such pulsed pseudolite technology.

Identification and Mitigation of Multipath and Multipath-Like Signals

The present invention can be used to address multipath and multipath-like interference (without loss of generality, hereafter referred to as multipath interference) in two parts: identification and mitigation. A receiver 400 equipped with the invention naturally lends itself to identifying potential multipath interference. Simply, an interference resistant GPS receiver 400 according to the present invention will attempt to acquire and track a second or more fingers (i.e., substantially identical signals that are delayed in time due to, e.g., reflection) for all active GPS processing channels. This technique is similar to those currently being used in the CDMA cell phone domain to acquire and track multipath signals.

When two channels of the receiver have "good lock" on the same PRN, then multipath interference is occurring. Comparisons of relative signal strengths, the use of PVT solutions using combinations of signals, and/or the use of additional navigation information (e.g., an inertial navigation system (INS)) can be used to identify the true signal and the corresponding true PVT solution. The remaining multipath signals may be eliminated as interference.

Although the present invention has been fully described in conjunction with the preferred embodiment with reference to the accompanying drawings, it is to be understood that various changes and modifications may be apparent to those skilled in the art. Such changes and modifications are to be understood as included within the scope of the present invention as defined by the appended claims.

What is claimed is:

1. A signal processing method, comprising:
   (a) an antenna receiving a composite signal (y), wherein y includes, from each of a plurality of signaling sources, at least one corresponding wireless signal comprising information;
   (b) obtaining, for each selected wireless signal in the composite signal and by a logic circuit and/or processor, signal modeling data;
   (c) based on the signal modeling data for each selected wireless signal, determining, by a logic circuit and/or processor, a respective model, each respective model containing both in phase and quadrature components of the corresponding selected wireless signal;
   (d) performing, by a logic circuit and/or processor, a projection of a representation of y onto a detection subspace to remove all of at least one interfering wireless signal ($s_o$) from at least one known interfering signaling source, the detection subspace being orthogonal to a complex interference subspace spanning a representation of the at least one interfering signal $s_o$ of the corresponding wireless signals, wherein said interference subspace is determined using said respective signal modeling data for the at least one interfering signal $s_o$, wherein said detection subspace is non-orthogonal and non-equivalent to a signal-of-interest subspace spanning a representation of another signal ($h_O$) of said corresponding wireless signals, and wherein step (d) is performed without estimating a phase of one or more of the at least one interfering wireless signal $s_0$;

(e) using, by a logic circuit and/or processor, a result from said step of performing for acquiring said another corresponding signal $h_O$; and (f) after acquiring the signal $h_O$, determining, by a logic circuit and/or processor, the information from the signal $h_O$.

2. The method of claim 1, wherein the composite signal is sampled to provide both the in phase and quadrature components of the composite signal and wherein the interference subspace does not include a representation of the signal $h_O$.

3. The method of claim 1, wherein the signal modeling data of each selected wireless signal comprises estimates of time offset, a Doppler data, and a signal frequency and not of phase, wherein the representation of the signal $h_O$ is characterized by a respective signal model and wherein the model represents the in phase and quadrature components of the signal $h_O$.

4. The method of claim 3, wherein the respective model for each of the selected wireless signals, including signal $h_o$, comprises both a real component and a complex component and excludes a phase estimate.

5. The method of claim 3, wherein the respective modeling data for the at least one interfering signal $s_0$ does not include the phase of the at least one interfering signal $s_0$ and wherein the respective modeling data is dependent upon one or more of (a) a coarse acquisition code and a carrier frequency and (b) a coarse acquisition code, a precise positioning code, and a carrier frequency.

6. The method of claim 1, wherein the respective signal modeling data comprises estimates of a pseudo-random number, code offset data, and Doppler data and excludes a phase estimate, wherein the information in the selected wireless signals is navigation data, wherein said navigation data comprises one or more of a telemetry word, hand-over word, clock correction, SV health/accuracy, ephemeris parameter, almanac data, and ionospheric model data, and further comprising:

determining, by a logic circuit and/or processor, navigation information using the navigation data from a plurality of said selected wireless signals including the signal $h_O$, and wherein the navigation information comprises data identifying one or more of: a position, a velocity, and time for the antenna.

7. The method of claim 1, wherein step (d) is performed without input from a Phase Locked Loop (PLL) and further comprising:

identifying, for each of the selected wireless signals and by a logic circuit and/or processor, a corresponding set of interfering signals, wherein a first wireless signal has a first set of interfering signals, wherein a second wireless signal has a second set of interfering signals, wherein the memberships of the first and second sets are different, wherein the first and second sets are created after each of the selected wireless signals has been acquired and tracked, wherein the acquiring and tracking comprises obtaining, as at least part of the corresponding signal modeling data, two or more of a pseudo-random number, code offset data, Doppler data, code offset rate, and Doppler rate, and wherein the identification of a signal as an interfering signal is based on threshold criteria that includes at least one of: (a) a predetermined number of the strongest of said corresponding signals, (b) a predetermined decibel increase above a predetermined value, (c) a signal-to-noise ratio, (d) a signal-to-carrier ratio, (e) a carrier-to-noise ratio, (f) a relative amplitude, and (g) a weighted sum of two or more of (a) through (f).

8. The method of claim 1, further including a step of constructing, by a logic circuit and/or processor, a reference signal from the signal modeling data for $s_O$, the reference signal being used to determine said complex interference subspace, wherein the reference signal for $s_O$ has the following representation:

$$s_o = sI_0 + i*sQ_0$$

wherein the reference signal for $s_0$ is composed of a real component $sI_0$, which is a column vector containing the in-phase component, and a complex component $i*sQ_0$, where $i=\sqrt{-1}$ and $sQ_0$, which is a column vector containing the quadrature component.

9. The method of claim 1, wherein each of the signal models is complex and wherein the selected wireless signals have unequal powers and wherein the obtaining step comprises the substeps:

(b1) tracking and acquiring, by a logic circuit and/or processor, the wireless signal $h_0$ having a first power; and (b2) identifying, by a logic circuit and/or processor, each of the plurality of wireless signals having a power greater than the first magnitude as an interferer and those having a power less than the first magnitude as a noninterferer; wherein in the performing step (d) the at least one interfering signal ($s_0$) comprises only the signals identified as interferers.

10. The method of claim 1, wherein the selected wireless signals have unequal powers and wherein the obtaining step comprises:

(b1) tracking and acquiring, by a logic circuit and/or processor, at least some of the plurality of selected wireless signals;

(b2) grouping, by a logic circuit and/or processor, the tracked and acquired selected wireless signals based on the relative powers of the signals; and (b3) for each ungrouped selected wireless signal, performing, by a logic circuit and/or processor, step (d), wherein the at least one interfering signal ($s_0$) comprises the grouped selected wireless signals; wherein step (e) is performed for each ungrouped selected wireless signal.

11. The method of claim 1, wherein each of the respective models is complex, wherein the complex interference subspace in step (d) is multiplied by a complex conjugate, and wherein the projection of a representation of y onto the detection subspace is performed using at least one adjoint operator.

12. A computer readable medium comprising processor executable instructions to perform the steps of claim 1.

13. A logic circuit operable to perform the steps of claim 1.

14. The method of claim 3, wherein the respective model for each of the selected wireless signals, including signal $h_o$, comprises both a real component and a complex component and excludes a phase estimate.

15. The signal processing method of claim 1, wherein step (d) removes substantially all interfering wireless signals from known interfering signaling sources from the composite signal y to permit acquisition of signal $h_O$.

16. A signal processing system, comprising:

(a) an antenna operable to receive a composite signal (y), the composite signal y including, from each of a plurality of signaling sources, at least one corresponding wireless signal comprising signaling information;

(b) a matched subspace detector operable to:

(i) obtain, for each selected wireless signal in the composite signal, respective signal modeling data indicative of the corresponding wireless signal, (ii) based on the signal modeling data for each selected wireless signal, determining a respective model, each respective model containing both in phase and quadrature components of the corresponding selected wireless signal and excludes a phase estimate; and (iii) project a representation of y onto a detection subspace to remove all of at least one interfering wireless signal ($s_0$) from at least one known interfering signaling source, the detection subspace being orthogonal to an interference subspace spanning a representation of the at least one interfering signal $s_0$ of the corresponding wireless signals, wherein said interference subspace is determined using said respective signal modeling data for the at least one interfering signal $s_0$ and wherein said detection subspace is non-orthogonal and non-equivalent to a signal-of-interest subspace spanning a representation of another signal ($h_O$) of said corresponding wireless signals; and (c) a processing channel operable, based on a result of the projection, to acquire said another corresponding signal $h_O$ and, after acquiring the signal $h_O$, determine the information from the signal $h_O$.

17. The system of claim 16, wherein the interference subspace is complex and further comprising:
(d) a pre-amplifier operable to amplify the power of the received composite signal;
(e) a down converter operable to down convert, using signal mixing frequencies, and provide down converted in phase and quadrature components of the composite signal y;
(f) an oscillator operable to provide the signal mixing frequencies to the down converter;
(g) an analog-to-digital converter operable to convert the down-converted in phase and quadrature from analog to digital format; and
(h) a data store operable to store the signal modeling data for each of the tracked and acquired plurality of wireless signals.

18. The system of claim 16, wherein the composite signal is sampled to provide both the down-converted in phase and quadrature components of the composite signal, wherein operation (iii) is performed without estimating a phase of one or more of the selected wireless signals, and wherein the interference subspace does not include a representation of the signal $h_O$.

19. The system of claim 16, wherein the interference subspace is complex, wherein the representation of the signal $h_O$ is characterized by a respective signal model, and wherein the model represents the in phase and quadrature components of the signal $h_O$.

20. The system of claim 19, wherein the model for each of the corresponding wireless signals, including signal ho, comprises both a real component and a complex component.

21. The system of claim 19, wherein the modeling data for at least one interfering signal s0 does not include the phase of the modeled signal and wherein the modeling data is dependent upon one or more of (a) a coarse acquisition code and a carrier frequency and (b) a coarse acquisition code, a precise positioning code, and a carrier frequency.

22. The system of claim 16, wherein the respective signal modeling data comprises a pseudo-random number, code offset data, and Doppler data, wherein the information in the wireless signals is navigation data, wherein said navigation data comprises one or more of a telemetry word, hand-over word, clock correction, SV health/accuracy, ephemeris parameter, almanac data, and ionospheric model data, and further comprising:
determining navigation information using the navigation data from a plurality of said wireless signals including the signal $h_O$, and wherein the navigation information comprises data identifying one or more of: a position, a velocity, and time for the antenna.

23. The system of claim 16, wherein operation (iii) is performed without input from a Phase Locked Loop (PLL) and wherein the matched subspace detector is further operable to:
(iv) identify, for each of the selected wireless signals, a corresponding set of interfering signals, wherein a first wireless signal has a first set of interfering signals, wherein a second wireless signal has a second set of interfering signals, wherein the memberships of the first and second sets are different, wherein the first and second sets are created after each of the selected wireless signals has been acquired and tracked, wherein the acquiring and tracking comprises obtaining, as at least part of the corresponding signal modeling data, two or more of a pseudo-random number, code offset data, Doppler data, code offset rate, and Doppler rate, and wherein the identification of a signal as an interfering signal is based on threshold criteria that includes at least one of: (a) a predetermined number of the strongest of said corresponding signals, (b) a predetermined decibel increase above a predetermined value, (c) a signal-to-noise ratio, (d) a signal-to-carrier ratio, (e) a carrier-to-noise ratio, (f) a relative amplitude, and (g) a weighted sum of two or more of (a) through (f).

24. The system of claim 16, wherein the matched subspace detector constructs a reference signal from the signal modeling data for so, the reference signal being used to determine said interference subspace, wherein the interference subspace is complex, wherein the reference signal for so has the following representation:

$$s_o = sI_0 + i^* sQ_0$$

wherein the reference signal for $s_0$ is composed of a real component $sI_0$, which is a column vector containing the in-phase component, and a complex component $i^*sQ_0$, where $i=\sqrt{-1}$ and $sQ_0$, which is a column vector containing the quadrature component.

25. The system of claim 16, wherein each of the signal models is complex and wherein the selected wireless signals have unequal powers and wherein the acquiring operation comprises the sub-operations of:
tracking and acquiring the wireless signal $h_0$ having a first power; and
identifying each of the plurality of wireless signals having a power greater than the first magnitude as an interferer and those having a power less than the first magnitude as a noninterferer; wherein in the projecting operation the at least one interfering signal ($s_0$) comprises only the signals identified as interferers.

26. The system of claim 17, wherein each of the signal models is complex and wherein the selected wireless signals have unequal powers and wherein the obtaining operation comprises the suboperations of:
tracking and acquiring at least some of the plurality of selected wireless signals;
grouping the tracked and acquired selected wireless signals based on the relative powers of the signals; and
for each ungrouped selected wireless signal, performing the projecting operation, wherein the at least one interfering signal ($s_O$) comprises the grouped selected wireless signals; wherein the acquiring operation is performed for each ungrouped selected wireless signal.

27. The system of claim 17, wherein the signal modeling data of each selected wireless signal comprises estimates of time offset, a Doppler data, and a signal frequency and not of phase, wherein the representation of the signal $h_O$ is characterized by a respective signal model and wherein the model represents the in phase and quadrature components of the signal $h_O$.

28. The signal processing system of claim 16, wherein operation (iii) removes substantially all interfering wireless signals from known interfering signaling sources from the composite signal y to permit acquisition of signal ho.

29. A signal processing method, comprising:
  (a) an antenna receiving a composite signal (y), wherein y includes, from each of a plurality of signaling sources, at least one corresponding wireless signal comprising information;
  (b) obtaining, for each selected wireless signal in the composite signal and by a logic circuit and/or processor, signal modeling data, the respective model for each selected wireless signal comprises both a real component and a complex component and excludes a phase estimate;
  (c) based on the signal modeling data for each selected wireless signal, determining, by a logic circuit and/or processor, respective model, each respective model containing both in phase and quadrature components of the corresponding selected wireless signal;
  (d) performing, by a logic circuit and/or processor, a projection of a representation of y onto a detection subspace to remove all of at least one interfering wireless signal ($s_O$) from at least one known interfering signaling source, the detection subspace being orthogonal to a complex interference subspace spanning a representation of the at least one interfering signal $s_O$ of the corresponding wireless signals, wherein said interference subspace is determined using said respective signal modeling data for the at least one interfering signal $s_O$ and wherein said detection subspace is non-orthogonal and non-equivalent to a signal-of-interest subspace spanning a representation of another signal ($h_O$) of said corresponding wireless signals, wherein step (d) is performed without estimating a phase of one or more of the selected wireless signals and wherein the complex interference subspace in step (d) is multiplied by a complex conjugate;
  (e) using, by a logic circuit and/or processor, a result from said step of performing for acquiring said another corresponding signal $h_O$; and
  (f) after acquiring the signal $h_O$, determining, by a logic circuit and/or processor, the information from the signal $h_O$.

30. The signal processing method of claim 29, wherein step (d) removes substantially all interfering wireless signals from known interfering signaling sources from the composite signal y to permit acquisition of signal $h_O$.

* * * * *